United States Patent
Amos et al.

(10) Patent No.: US 7,824,516 B2
(45) Date of Patent: Nov. 2, 2010

(54) EMBOSSING METHOD AND APPARATUS

(75) Inventors: Richard M Amos, Malvern (GB); Guy P Bryan-Brown, Malvern (GB); Emma L Wood, Malvern (GB); John C Jones, Malvern (GB); Philip T Worthing, Malvern (GB)

(73) Assignee: ZBD Displays Limited, Malvern (GB)

( * ) Notice: Subject to any disclaimer, the term of this patent is extended or adjusted under 35 U.S.C. 154(b) by 1046 days.

(21) Appl. No.: 10/512,877

(22) PCT Filed: May 13, 2003

(86) PCT No.: PCT/GB03/02015

§ 371 (c)(1),
(2), (4) Date: Oct. 29, 2004

(87) PCT Pub. No.: WO03/095175

PCT Pub. Date: Nov. 20, 2003

(65) Prior Publication Data

US 2005/0150589 A1      Jul. 14, 2005

(30) Foreign Application Priority Data

May 13, 2002  (EP) ................................. 02253326
Nov. 21, 2002  (GB) ................................. 0227221.9

(51) Int. Cl.
*B32B 15/00* (2006.01)
(52) U.S. Cl. .................. 156/247; 156/230; 264/284; 264/293; 427/372.2; 716/19
(58) Field of Classification Search .................. None
See application file for complete search history.

(56) References Cited

U.S. PATENT DOCUMENTS

| 3,918,875 A | 11/1975 | Newman et al. |
| 4,127,436 A * | 11/1978 | Friel .......................... 430/315 |
| 4,326,010 A | 4/1982 | Bauer |

(Continued)

FOREIGN PATENT DOCUMENTS

GB    2 290 629    1/1995

(Continued)

OTHER PUBLICATIONS

Patent Abstracts of Japan, vol. 007, No. 262 (p. 238), Nov. 1983 & JP 58-143348 Aug. 1983.

*Primary Examiner*—Philip C Tucker
*Assistant Examiner*—Kimberly K McClelland
(74) *Attorney, Agent, or Firm*—Nixon & Vanderhye P.C.

(57) ABSTRACT

A method and apparatus for forming a patterned layer having a surface profile that provides relief structures within an electronic device. The method comprises the steps of taking a carrier film (50) having an inverse of the required surface profile formed on one side thereof, taking a layer of fixable material (54) located on a substrate (52), laminating the carrier film (50) and substrate (52) such the carrier film causes the required surface profile to be formed in the layer of fixable material with a predetermined offset, and then fixing the fixable material. Lamination may be performed using rollers (56,58) or a vacuum process. The process is designed to ensure that the offset can be kept as low as possible, preferably to within 150 nm.

41 Claims, 33 Drawing Sheets

U.S. PATENT DOCUMENTS

Figure 1:
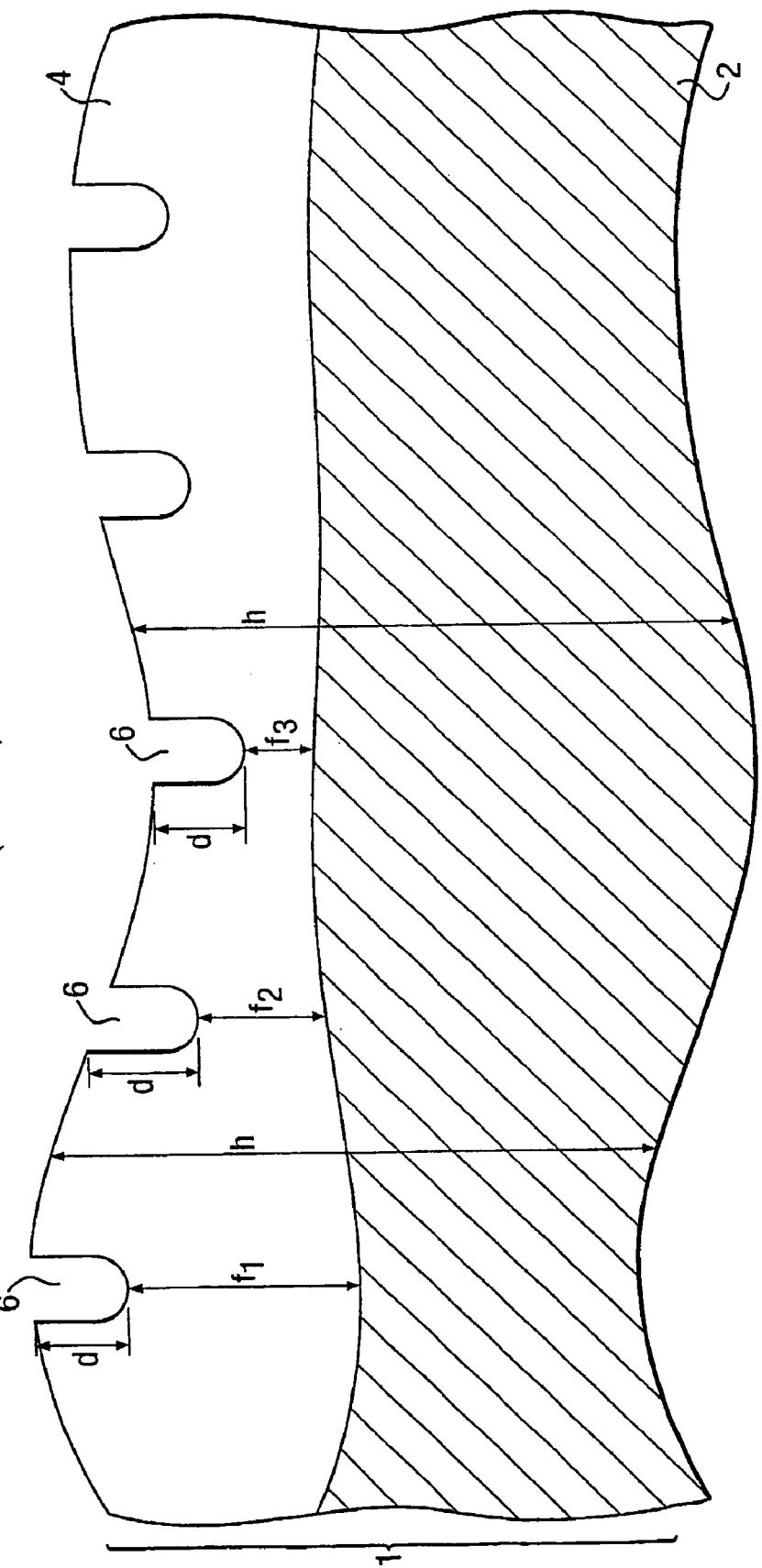

| Patent No. | Date | Inventor(s) |
|---|---|---|
| 4,388,137 A | 6/1983 | McCarty et al. |
| 4,482,511 A | 11/1984 | Komatsubara |
| 4,486,363 A | 12/1984 | Pricone et al. |
| 4,510,593 A | 4/1985 | Daniels |
| 4,512,848 A | 4/1985 | Deckman et al. |
| 4,560,578 A | 12/1985 | Freeman |
| 4,601,861 A | 7/1986 | Pricone et al. |
| 4,657,780 A | 4/1987 | Pettigrew et al. |
| 4,758,296 A | 7/1988 | McGrew |
| 4,790,893 A | 12/1988 | Watkins |
| 4,933,120 A | 6/1990 | D'Amato et al. |
| 5,037,668 A | 8/1991 | Nagy |
| 5,116,548 A | 5/1992 | Mallik et al. |
| 5,147,938 A | 9/1992 | Kuller |
| 5,155,604 A | 10/1992 | Miekka et al. |
| 5,188,863 A | 2/1993 | de Graaf et al. |
| 5,279,689 A | 1/1994 | Shvartsman |
| 5,465,176 A | 11/1995 | Bianco et al. |
| 5,468,542 A * | 11/1995 | Crouch ............ 428/215 |
| 5,480,596 A | 1/1996 | Okubo et al. |
| 5,554,413 A | 9/1996 | Kanetaka et al. |
| 5,575,878 A | 11/1996 | Cox et al. |
| 5,597,613 A | 1/1997 | Galarneau et al. |
| 5,804,017 A | 9/1998 | Hector |
| 5,861,113 A | 1/1999 | Choquette et al. |
| 6,150,024 A | 11/2000 | Dhoot et al. |
| 6,159,398 A | 12/2000 | Savant et al. |
| 6,252,253 B1 * | 6/2001 | Bao et al. ............ 257/89 |
| 6,309,580 B1 | 10/2001 | Chou |
| 6,605,172 B1 * | 8/2003 | Anderson et al. ...... 156/199 |
| 6,858,253 B2 * | 2/2005 | Williams et al. ...... 427/277 |
| 6,954,275 B2 * | 10/2005 | Choi et al. .......... 356/614 |
| 6,964,793 B2 * | 11/2005 | Willson et al. ....... 427/466 |
| 2001/0028426 A1 | 10/2001 | Brown et al. |
| 2002/0122995 A1 * | 9/2002 | Mancini et al. .......... 430/5 |

FOREIGN PATENT DOCUMENTS

| | | |
|---|---|---|
| WO | WO 90/15673 | 12/1990 |

* cited by examiner

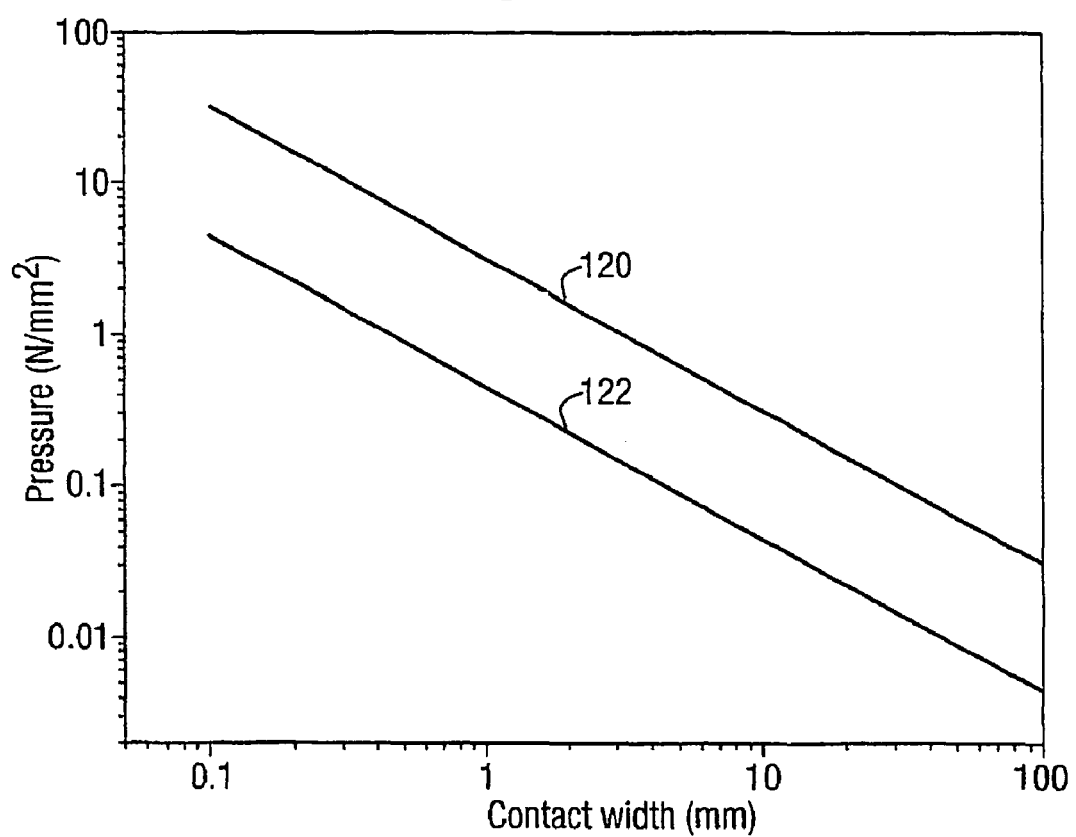

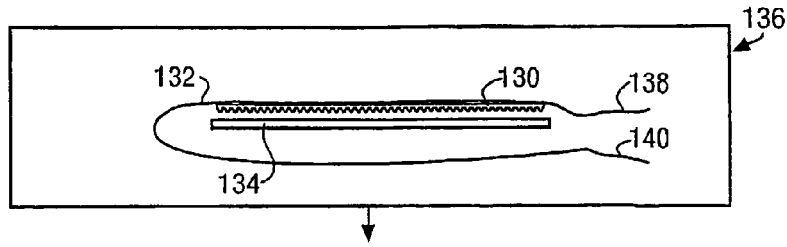
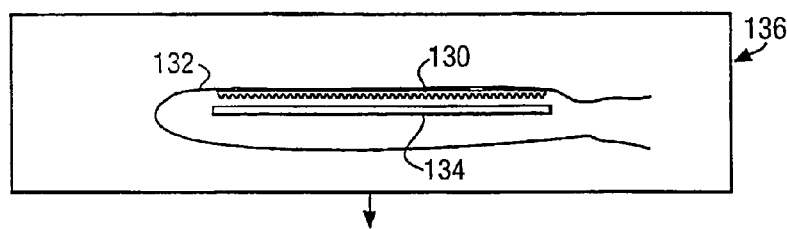
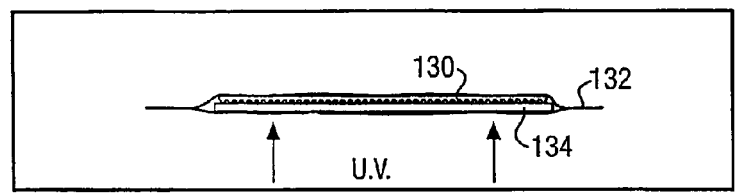
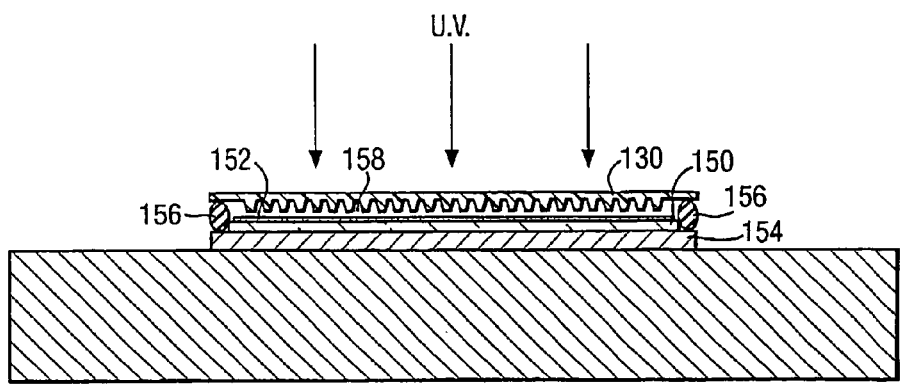

EMBOSSING METHOD AND APPARATUS

This application is the US national phase of international application PCT/GB2003/002015, filed in English on 13 May 2003, which designated the US. PCT/GB2003/002015 claims priority to EP Application No. 02253326.9 filed 13 May 2002 and GB Application No. 0227221.9 filed 21 Nov. 2002. The entire contents of these applications are incorporated herein by reference.

This invention relates to a method of embossing a surface profile in a layer of fixable material such as a photopolymer. More particularly, the invention relates to an embossing method for fabricating surface profiles for use in electronic or electro-optic structures such as liquid crystal devices, micro-electro-mechanical, micro-fluidic or organic semiconductor devices such as organic light emitting diodes (OLED).

Liquid crystal devices (LCDs) typically comprise a thin layer of liquid crystal material contained between a pair of cell walls. A treatment is usually applied to the internal surfaces of the cell walls to induce the required liquid crystal surface alignment. The bulk of the liquid crystal then adopts a configuration that depends on the surface alignment properties of the cell walls and on various other factors, such as the type of liquid crystal material and the thickness of the liquid crystal layer. Electrodes are also located on one or both cell walls to enable the application of an electric field to the liquid crystal layer.

One particular type of known liquid crystal device is the Zenithal Bistable Device (ZBD) described in patent EP0856164/U.S. Pat. No. 6,249,332. In this device a periodic, surface relief grating profile is formed on the internal surface of one bounding cell wall. The grating profile is designed to permit the liquid crystal in the device to be electrically switched between any one of two stable, and optically distinguishable, configurations. It is also known that multi-stability can be obtained by provision of a suitable grating profile; e.g. see WO 02/08825.

Aperiodic grating structures have also been shown to provide zenithal bistability; for example see WO 01/40853. Azimuthal bistable devices (ABD) fabricated using grating structures are also known (see EP0744041), as are various surface structures that can be used to provide vertically aligned nematic devices (e.g. see Koike et al, 1997, IDW, p159-162). Bigrating devices have also been described previously (e.g. EP0744042) as have bistable twisted nematic devices. Bistable cholesteric and ferroelectric liquid crystal devices (including such devices having polymer walls as described in GB2315900) are also known. In addition, there are numerous monostable LCDs for which surface relief structures can be used for alignment. For example optically controlled birefringence (OCB or "Pi cells"), vertically aligned nematic (VAN), hybrid aligned nematic (HAN), twisted nematic (TN) and super twisted nematic (STN).

In certain prior art devices, the periodic grating profile required for liquid crystal alignment is etched in a layer of material. For example, a layer of photo-resist material on a glass substrate can be exposed to a pattern of light of a periodically varying intensity. The photo-resist is then developed to provide a periodic grating profile. However, such techniques are not suited to low cost mass production of liquid crystal devices, being limited by cost and throughput.

It is also known to use embossing techniques to stamp a surface profile into a layer of plastic. For example, standard hot foil embossing or stamping techniques have been used to produce grating profile structures in plastic that are suitable for use as liquid crystal alignment layers (e.g. Lee et al, Jpn. J. Appl. Phys. Vol. 32 (1993) pp. L1436-L1438). Various alternative embossing techniques are also known and have been used to form optical storage media (e.g. U.S. Pat. No. 4,790,893) and diffraction-refraction high gloss papers (e.g. U.S. Pat. No. 6,358,442). However, the prior art embossing techniques have the disadvantage of not being able to provide surface relief structures with both the required uniformity and required range of relief structure shape, in particular the minimum thickness of the embossed structure. For example, in liquid crystal devices embossing by prior art techniques would not provide grating profiles with the level of uniformity that is required to attain uniform liquid crystal alignment and switching properties over large areas, or the voltage required to switch the device is unnecessarily high.

Organic LEDs, often comprising a poly-p-phenylene vinylene light emitting layer, are typically manufactured by ink-jet printing techniques. However, the resolution of this method is presently limited to about 5 dots per millimeter (i.e. 200 µm features). This severely limits the resolution of the devices that can be manufactured. For example, a logic circuit may need the semiconductor material to form 10 µm features or smaller. Methods that have been used in an attempt to overcome this limitation include using photo-lithographically defined surface relief structures to contain the ink drops and the patterning of low energy surfactants to form high resolution areas of wetting/de-wetting, to control the size and shape of the ink-drop on the surface. However, both of these methods are expensive to use for large area devices, and can limit the throughput during the manufacturing process.

Another type of electronic device is micro-electro-mechanical devices (MEMs). These are often constructed by standard photo-lithography techniques but this is unsuitable for large area display devices. An example of such a device is the modulator array described in U.S. Pat. No. 5,835,255, wherein the spacing between the walls of an electro-optic cavity are modified electrically to induce a change in reflectivity. The cavity is spaced using support posts that are photo-lithographically defined onto the substrate. This adds substantial cost to the device, and can ultimately limit the area over which it can be manufactured.

It is an object of the present invention to mitigate at least some of the above mentioned disadvantages.

According to a first aspect of the invention, a method of embossing a layer of fixable material with a surface profile comprises the steps of;

a) talking a carrier film having an inverse of the required surface profile formed on one side thereof, b) taking a layer of fixable material located on a substrate that comprises an electrode, c) laminating the carrier film and substrate such the carrier film causes the required surface profile to be formed in the layer of fixable material, and d) fixing the fixable material, wherein the method is performed such that the offset of the surface profile divided by the relative permittivity of the fixable material is less than 1000 nm.

More preferably, the offset of the surface profile divided by the relative permittivity of the fixable material is less than 100 nm, less than 50 nm or less than 10 nm.

Herein, the relative permittivity of the fixable material is the value measured within the range of frequencies that are to be applied to the electrode or electrodes of the substrate. This will usually be restricted to frequencies less than 10 GHz. It may also be advantageous for the resistivity of the fixable material after fixing to be greater than $1 \times 10^8$ Ω/cm.

Herein the term "offset" means the underlying thickness of the layer of fixable material on the substrate electrode. For example, a patterned structure could be considered to consist of a patterned layer on top of an underlying non-patterned layer of constant thickness; in such a case the thickness of the underlying non-patterned layer of constant thickness is the offset. In the case of a grating, the offset would be the thickness of the fixable material between the grating trough and the substrate. In the case of true zero offset, the bottom of a grating trough would have zero thickness of material (i.e. the substrate would not be coated with fixable material in the region of the grating trough). Describing this mathematically, the surface relief profile could be considered as a Fourier series of spatial frequencies where the offset is the DC component.

Prior art methods only provide layers of fixable material having a predetermined surface shape. The prior art methods do not provide control over the absolute height profile of the layer of the fixable material with respect to the local substrate (i.e. there is no control over the offset). As the prior art embossing methods have no control over the offset (i.e. it varies in an uncontrolled manner) it has to date been necessary to ensure the thickness of fixable material is above a certain minimum to ensure the required surface pattern is reproduced without truncation or similar such error. This means the prior art techniques can not produce a uniform offset level (e.g. the height of material at the trough of a grating profile) that approaches zero over the substrate. The present invention thus has the advantage of providing fixable material layers with surface profiles having a predetermined and controllably low offset. For a typical material with a relative permittivity of 4, the offset (e.g. the thickness of material at a grating trough) is less than 0.41 μm. This low, and uniform, offset provides advantages over prior art embossing techniques. In particular, the reduced offset decreases the amount of material that remains on the substrate after it has been fixed. Hence, the voltage drop across the layer of fixable material is reduced accordingly.

The reduced voltage drop across the embossed layer has advantages for many electro-optic and electrical devices: for example it allows LCDs to be produced with uniform switching/latcthing properties. Greater switching uniformity is especially advantageous in multiplexed LCDs. The ability to produce layers having an offset near zero (e.g. the thickness of material at grating troughs being near zero) minimises the average thickness of the layer of fixable material and hence reduces the voltages required to switch the pixels in a liquid crystal device. The power consumption of such displays is thereby reduced.

It will be clear to those skilled in the art that the substrate, and more importantly, the electrode formed on top of the substrate, may not be flat. It is an aim of the present invention to ensure that the desired structure is reproduced on said undulating electrode without significant change to the offset. Therefore, the method may also advantageously comprise the step of ensuring that there is contact between the carrier film and the electrode carried on the substrate. In this way, the required low (near zero) offset can be provided.

A means that is suitable for determining that contact is made between the carrier film and the substrate may include a transducer or similar such system that determines the pressure applied to the carrier film and substrate during the lamination step. A transducer may also be used that determines the relative speed of the carrier film and substrate to the point or area in the lamination step that pressure is applied. Furthermore method of optical inspection, such as measurement of interference fringes, could be employed. Preferable any such measurement method uses a feedback mechanism to ensure that the correct offset is maintained. Alternatively, any such measurements may be compared to previous calibration data acquired from the system.

Contact is defined in this context as proximity to within 2 μm of the highest amplitude features on the inverse structure provided on the carrier film and the substrate. Preferably, this proximity is within 50 nm. This contact is limited by the hydrodynamic flow associated with the liquid fixable material. This in turn is related to the elastic modulus of the carrier film and the viscosity of the fixable material. It is preferable that the material properties of the carrier film and fixable material and the speed and pressure of embossing are each chosen to give the desired contact. Thus, contact is taken to be close to or at the so-called the dry contact limit.

It should be noted that the method may include further steps after fixing the fixable material to give the required surface relief structure. For example, the embossed structure may undergo a UV-ozone treatment for a set duration. This may cause a reduction of the offset. In this instance, the surface relief structure used on the carrier film may differ to some extent to the inverse of the surface relief structure required on the substrate. For example, the amplitude and mark to space ratio of a grating structure may change somewhat during this extra treatment step. As described below, the surface profile formed on one side of the carrier film is such that, when the carrier film is laminated with a fixable material coated substrate, the required pattern is formed in the fixable material. The required pattern may be a pattern which, after a post processing step, provides a suitable surface relief structure.

The present invention can also provide a low cost method for producing micro-patterned electronics if combined with ink-jet printing techniques. Take the example of a organic light emitting diode, such as the polymer LED described with reference to FIG. 14. Critical to obtaining efficient injection of holes at the ITO/semi-conducting polymer interface (and hence efficient light production) is good electrical contact Ink-jet droplets of the polymer produce 200 μm droplets on the surface of the substrate. For a colour device, the polymers used for red, green and blue must be separated to ensure high efficiency and good colour saturation of the device. However, spacing the droplets by 200 μm places a severe limitation on the resolution of colour OLED devices (to less than 50 dpi).

This may be solved by forming embossed walls around the centre of each droplet region that have the required size and spacing to contain the droplet into a particular area. The wall may be made from a material that limits optical losses from the OLED. If a conventional embossing method is used to create walls to define the individual pixel then there will be residual polymer material coating the ITO electrode; i.e. the prior art techniques cannot provide a zero or near zero offset. This will subsequently prevent good contact between the ITO and semiconductor, and inhibit formation of the diode junction. The ability to controllably produce zero or near zero offset structures in accordance with the present invention thus permits embossing to be used in the production of numerous electro-optic and electronic devices.

In such devices, it may be a very stringent requirement to ensure that there is direct contact between the electrode material and the deposited organic layer. This places a stringent requirement to achieve a zero offset condition. In such instances, it is often important to include an etching step following the fixing of the fixable material. For example, the surface may be prepared using a UV/ozone treatment to ensure good contact is made between the electrode and the organic semiconductor.

The carrier film having an inverse of the required surface profile means that the surface profile formed on one side of the carrier film is such that, when the carrier film is laminated with a fixable material coated substrate, the required pattern is formed in the fixable material. It should be noted that the pressure applied during the lamination step may be controlled to prevent any deformation of the surface profile of the carrier film, or the pressure may be sufficient to cause a predetermined distortion of the surface profile which results in the required surface profile being formed in the fixable material.

The lamination step for a particular fixable material and carrier film combination will thus provide the required surface profile with the necessary offset when the pressure applied is within a given range, or the product of the viscosity and throughput speed is within a given range. These ranges are interdependent, such that the optimum range of pressures is a function of the viscosity-speed product and vice-versa. The lower limit of the pressure range will be close to the contact condition described above, whereas the upper limit will be the highest pressure which causes an acceptable deformation of the surface profile that is embossed into the fixable material. In other words, the pressure will be selected to fall within a range that provides an acceptable distortion of the surface profile that is formed in the fixable material. For a pressure that is too low, or viscosity-speed product that is too great, the offset will be undesirably high and/or may vary to too great an extent. If the pressure is too high, or the viscosity speed product too low, the distortion of the profile of the carrier film may prevent the correct shape being reproduced.

For applications such as the alignment layers of liquid crystal devices, it is important that the embossed surface relief structure has both a particular profile and a low, reproducible offset. Prior art methods for embossing relief structures may lead to the required fabricating shape, but do not give sufficiently low offset, or lead to variations of the offset across the panel. Herein it is described how there is a regime of pressure, speed, viscosity and Young's modulus that gives an upper limit for maintaining the required profile, and a lower limit for ensuring the offset is minimal thereby satisfying both requirements.

The above mentioned embossing regime of pressure, speed, viscosity and Young's modulus could be used with prior art techniques to implement direct embossing using a Nickel shim. However, it has been found that in addition to the offset uniformity problems described above, operation within the above regime using prior art direct embossing techniques will lead to damage of the nickel shim due to contaminants on the substrate. This is because the forces at small contaminants are higher than the elastic limit for the Nickel and lead to plastic deformation of the shim. This is then reproduced in subsequent uses of that shim, leading to poor uniformity of the resulting structure. The use of a carrier film in accordance with the present invention alleviates this problem by allowing the shim to be used to emboss the carrier film; as described above, the offset of the carrier film when using the technique of the present invention is unimportant. The carrier film produced from the shim is then used at pressure, viscosities and speeds required to give the desired offset and can be discarded after significant damage.

The carrier film can be wider or narrower than the substrate, and the substrate may be completely or partially coated with the layer of fixable material. Continuous rolls of carrier film may be used. The carrier film is sufficiently flexible to be able to conform to any non-uniformities in the roller and/or the substrate to ensure a constant offset across the embossed fixable material layer within a small distance from the non-uniformity (eg 50 μm). Only specific portions of the fixable material may be cured by the use of a shadow mask; i.e. portions may remain uncured and possibly be removed by a subsequent cleaning step.

As described above, various surface profiles are known that provide surface alignment to liquid crystal materials. These surface profiles may provide the required alignment effect alone, or may be treated with a certain alignment layer (e.g. a homeotropic treatment) prior to use in a liquid crystal device. A person skilled in the art would recognise the type of surface profile and any extra layers that are necessary to produce the required surface alignment effect. For example, EP0856164 and WO 01/40853 describe surface profiles required to produce zenithal bistable liquid crystal devices and EP0744041 describes an azimuthal bistable device.

The fixable material may be any material that undergoes a permanent increase in viscosity in reaction to heat, radiation and/or mixing two or more components. For example, the fixable material may be a resin or lacquer. The step of fixing the fixable material involves permanently increasing the viscosity of the fixable material by exposing it to heat and/or radiation and/or by mixing two or more components as appropriate.

Preferably, the resistivity of the fixable material after fixing is greater than $1 \times 10^8$ Ω/cm, more preferably $1 \times 10^9$ Ω/cm, and more preferably greater than $1 \times 10^{10}$ Ω/cm.

Advantageously, the method further comprises the step, after the step of fixing the fixable material is performed, of removing the carrier film from the layer of fixable material.

The carrier film may be disposed of after use. Alternatively, sheets or lengths or carrier film could be used, possibly cleaned, and then re-used. An advantage of the present invention over prior art methods that use nickel shims or patterned rollers to emboss layers of fixable material is that the requirement for cleaning during the manufacturing process is reduced, if not removed.

As the surface used to emboss the unfixed layer of fixable material is not used repeatedly (unlike a patterned roller technique) the carrier film will always have a clean surface guaranteeing optimum release with minimal degradation in pattern transfer. The reduction of contaminants is especially advantageous in the fabrication of LCD alignment surfaces as such contaminants may adversely affect the uniformity of liquid crystal alignment and switching.

Conveniently, the fixable material weakly adheres to the side of the carrier film carrying the inverse of the required surface profile to facilitate removal of the carrier film from the fixed layer of fixable material.

Advantageously, at least one additional layer is interposed between the layer of fixable material and the carrier film prior to lamination. The additional layer may be located on the carrier film or the fixable material as appropriate. This layer may be a low energy material (e.g. a material providing a surface energy less than 50 mN/m or more preferably less than 25 mN/m) to aid release of the carrier film from the fixable material during delamination.

One or more of the at least one additional layers may be a metal (e.g Nickel, Aluminium or Chrome), a fluorinated polymer (e.g. plasma polymerised PTFE) or a silicone material. Also, the embossed layer may be separated from the electrode by an inorganic layer. For example, a silicon dioxide or titanium dioxide precursor layer may be spin coated onto the electrode, and then baked to form a uniform layer onto which the embossed structure is fabricated.

Conveniently, the substrate is formed from a brittle material. The method is advantageous, compared with prior art techniques, when used with a brittle (i.e. easily breakable) substrate. Known methods of directly embossing resin layers using a nickel shim roller could only be implemented using flexible substrates because the pressure required to emboss the pattern typically causes a brittle substrate to shatter.

Advantageously, the substrate is formed from two or more layers. For example, a layer of ITO or reflective structures (such as metal etc) on a layer of plastic or glass may form the substrate. The substrate may also comprise various active electrical elements such as thin film transistors, electronic drivers etc.

Conveniently, the substrate is formed from glass.

Preferably, the fixable material is a resin that is curable using ultra-violet radiation. If the substrate is transparent to UV radiation, the UV may be directed on to the resin through the substrate. Alternatively, if the substrate is opaque to UV radiation, the UV radiation may be directed on to the resin through the carrier film. It would be immediately apparent to a person skilled in the art that either the carrier film and/or the substrate must transmit the particular wavelength of radiation that is required to cure the resin.

Conveniently, the fixable material should be substantially transparent to a range of wavelengths suitable for use in an electro-optic device.

Advantageously, the viscosity of the fixable material is within the range of 0.1 cPs to 10 Ps. More preferably, the viscosity is greater than 5 cps or even more preferably greater than 50 cPs. Preferably, the viscosity is less than 200 cPs. In the case of liquid crystal alignment layers, the refractive index of the fixable material may also be selected to match the refractive index of the liquid crystal material to reduce any unwanted diffraction effects. Alternatively, the refractive index of the fixable material should be as different as possible when used as the surrounding wall for an OLED to increase the external efficiency of the optical emission.

Conveniently, the pressure applied during lamination is less than the pressure required to deform the inverse surface profile formed on the carrier film. For example, the pressure applied during lamination may be less than 10 MPa and may be greater than 0.10 Pa. The use of this amount of pressure ensures that a faithful, high fidelity, reproduction of the surface profile is formed in the layer of fixable material.

The range of pressures required to achieve the correct relief shape and offset is related to the viscosity of the fixable material before fixing and the throughput speed of the substrate relative to the carrier film. For example, a viscosity of the fixable material before fixing of 70 cPs and throughput speeds from 0.1 cm/min to 100 cm/min typically requires the range of pressures between 100 Pa and 30 kPa. The upper limit of the pressure is related to several factors, including the Young's modulus of elasticity for the inverse relief structure on the carrier film, the rigidity modulus for the said relief structure and ultimately the limit of fracture for the substrate material and/or the electrode structure.

It is preferred that the throughput speed is greater than 4 cm/min and more preferably greater than 10 cm/min. Such throughput speeds enable efficient, cost effective, operation of the technique in a production facility.

Advantageously, during the lamination step, the carrier film is brought into contact with the substrate carrying the layer of fixable material and passed through a means of applying the pressure required for lamination. In other words, the substrate and the carrier film are moved relative to a means of applying pressure. The pressure between the carrier film and the substrate should be kept constant to within a certain tolerance. The equipment is advantageously provided with means of monitoring the pressure, and a feedback mechanism for controlling the applied pressure may also be advantageously provided. The relative speed of the carrier film and substrate to the roller may also be monitored, and a feedback mechanism for controlling the speed provided. Advantageously, both pressure and throughput speed will be monitored and controlled.

Preferably, the means of applying the pressure required for lamination comprises at least one lamination roller.

Advantageously, the means of applying the pressure required for lamination comprises a first lamination roller in contact with the carrier film and a second lamination roller in contact with the side of the substrate not carrying the layer of fixable material, the first and second lamination rollers being biased toward one another. Preferably the roller or rollers are incorporated into a system designed to give a constant pressure. This may be a pneumatic system, although other systems are possible, such as piezo-electric system with feedback mechanism.

Conveniently, the carrier film is removed from the fixed fixable layer using at least one separation roller.

Preferably, the fixing step is performed by applying the appropriate treatment in a region between the at least one lamination roller and the at least one separation roller.

In certain prior art methods, the resin (i.e. the fixable material) must be cured whilst it is in contact with the rollers and the size of the contact region and the UV lamp power determine the machine throughput. High power UV lamps are thus required, which are expensive and will transfer heat to the embossed structure thereby inducing stress and defects. There are also difficulties associated with fitting physically large and heavy lamps around a roller.

The method of the present invention allows the fixing step to be performed a distance from the lamination step. In the case of the fixable material being a UV curable resin it is possible to use lower power, cheaper UV lamps without affecting throughput Furthermore, less heat is transferred to the resin reducing stress in the cured film thereby increasing the quality of the embossed layer of fixable material.

Advantageously, at least one lamination roller is deformable. The entire roller may be deformable, or the surface region of the roller may be deformable. For example, the roller may comprise a rubber type supported by a central metal core. At least one lamination roller comprises rubber, preferably with a Shore hardness in the range of 50 to 90.

Preferably, the radius of the at least one lamination roller is greater than 1 cm and/or less than 1 m.

Conveniently, the substrate carrying the layer of fixable material is passed through the means of applying the pressure required for lamination at a linear speed greater than 0.1 mm per second and/or less than 100 cm per second. More preferably, the linear speed greater than 1 mm per second and/or less than 10 cm per second.

Conveniently, the lamination step is performed by biasing the carrier film toward the substrate using gas pressure. For example, a vacuum bag technique or various o-ring seal configurations could be used for lamination. Such techniques have the potential to provide high throughput.

Advantageously, the method comprises the additional step of forming the carrier film using a patterned roller or by embossing a thermoplastic film.

The carrier film preferably comprises any one of PET, PC or PEA. Alternatively, treated paper or polymer films may be used.

The carrier film is preferably formed by the steps of (a) talking a plastic film, (b) depositing a layer of fixable material thereon, (c) patterning the layer of fixable material using a patterned roller, and (d) fixing the fixable material.

Preferably, the step of patterning the layer of fixable material using a patterned roller comprises locating the patterned roller a fixed distance from one or more support rollers, and passing the plastic film, with the layer of fixable material deposited thereon, through the rollers such that the total thickness of the carrier film is invariant with variations in the thickness of the plastic film.

Conveniently, the surface profile formed in the fixable material is suitable to provide alignment of liquid crystal material in a liquid crystal device.

Advantageously, the surface profile formed in the fixable material is suitable to provide zenithal bistable alignment of liquid crystal material in a liquid crystal device.

Conveniently, the amplitude of the embossed surface profile is less than 50 µm or less than 20 µm or less than 10 µm. Advantageously, the amplitude of the embossed surface profile is greater than 0.1 µm.

Preferably, the width of the features of the embossed surface profile is less than 100 µm and/or greater than 0.1 µm.

According to a second aspect of the invention, an apparatus is provided for implementing the lamination method according to the first aspect of the invention.

According to a third aspect of the invention a method of forming a layer having a surface profile that provides surface alignment to liquid crystal material comprises the steps of a) taking a carrier film having an inverse of the required surface profile formed on one side thereof, b) taking a layer of fixable material located on a substrate, c) laminating the carrier film and substrate such the carrier film causes the required surface profile to be formed in the layer of fixable material with a predetermined offset, and d) fixing the fixable material.

Preferably, the tolerance of the offset should be ±20% or more preferably ±10%. According to a fourth aspect of the invention, apparatus for forming a layer having a surface profile that provides surface alignment to liquid crystal material comprises lamination means configured to receive a carrier film having an inverse of the required surface profile formed on one side thereof and to engage said carrier film with a layer of fixable material located on a substrate with sufficient pressure such that an impression of the required surface profile is formed in the layer of fixable material with a predetermined offset.

Conveniently, the apparatus further comprises contact assessment means to ensure there is appropriate contact between the carrier film and the electrode carried on the substrate. In this way, the required low (near zero) offset can be ensured.

The contact assessment means may include a transducer or similar such system that determines the pressure used to engage the carrier film with the layer of fixable material carried on the substrate. Furthermore, optical inspection apparatus, such as measurement of interference fringes, can be used to measure film thickness and/or uniformity.

A further transducer may also be used that determines the relative speed of the carrier film and substrate to the point or area in the lamination step that pressure is applied.

The data acquired by the contact assessment means and any additional measurement systems (e.g. carrier film speed measurements, temperature probes etc.) may be fed to a microprocessor (e.g. a personal computer) to establish a feedback mechanism to ensure that the correct offset is maintained. Alternatively, a calibration process could be used periodically to ensure the apparatus embosses the layer of fixable material with the surface relief pattern that is required.

Advantageously, the lamination means comprises a pair of deformable rollers to engage the carrier film with the layer of fixable material located on the substrate. Conveniently, at least one of the deformable rollers comprises rubber, which may have a shore hardness within the range of 50 to 90.

Preferably, the apparatus additionally comprises means for fixing the fixable material and/or means for separating the carrier film from the fixed layer of fixable material.

According to a fifth aspect of the invention, a liquid crystal alignment layer comprises a surface profile formed in a layer of fixable material and having a predetermined offset.

According to a sixth aspect of the invention an electronic device comprises an embossed structure fabricated onto a substrate material such as glass or plastic, using the method according to the first aspect of the invention.

According to a seventh aspect of the invention an electro-optic device comprises an embossed structure fabricated using the method according to the first aspect of the invention.

According to an eighth aspect of the invention an organic semiconductor device comprises an embossed structure fabricated using the method according to the first aspect of the invention.

According to a ninth aspect of the invention a method of producing a semiconductor device comprises the step of embossing a structure to constrain a subsequently deposited semiconductor material.

Preferably, the method is used to produce an OLED or transistor.

Figure 2:
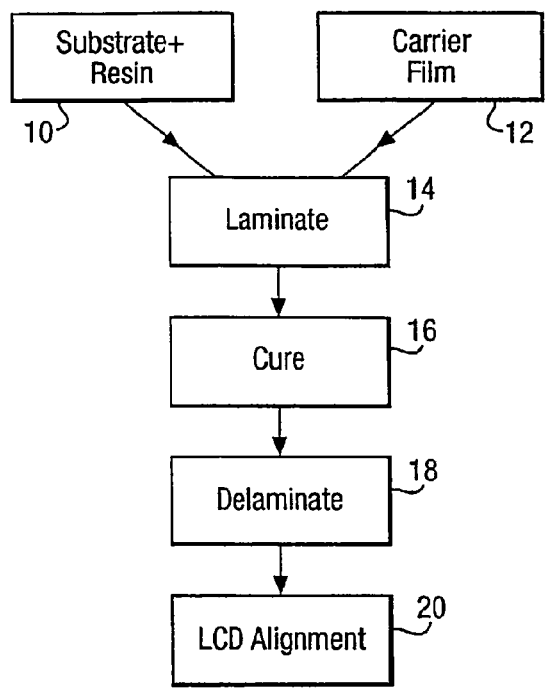
Figure 3:
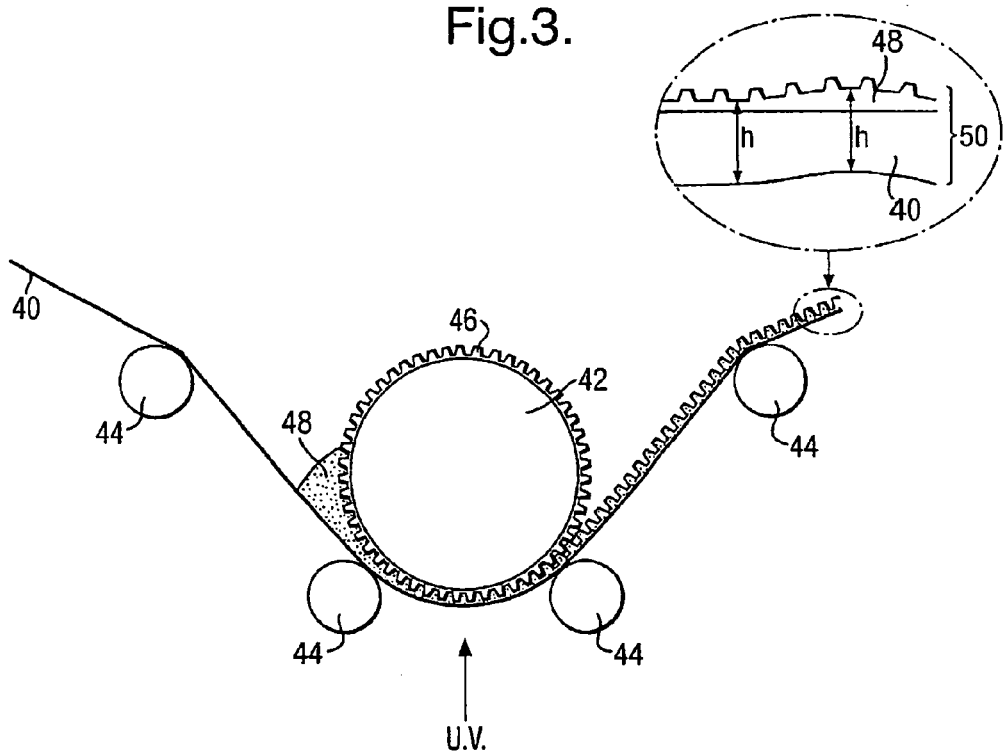
Figure 4:
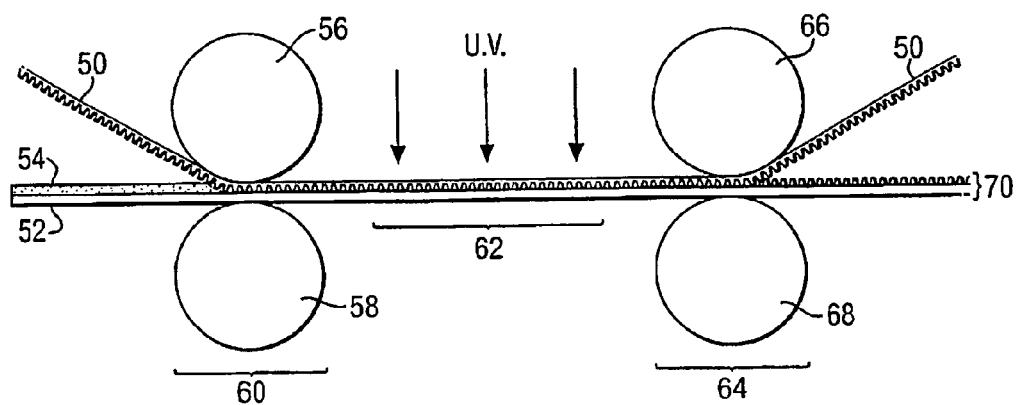
Figure 5:
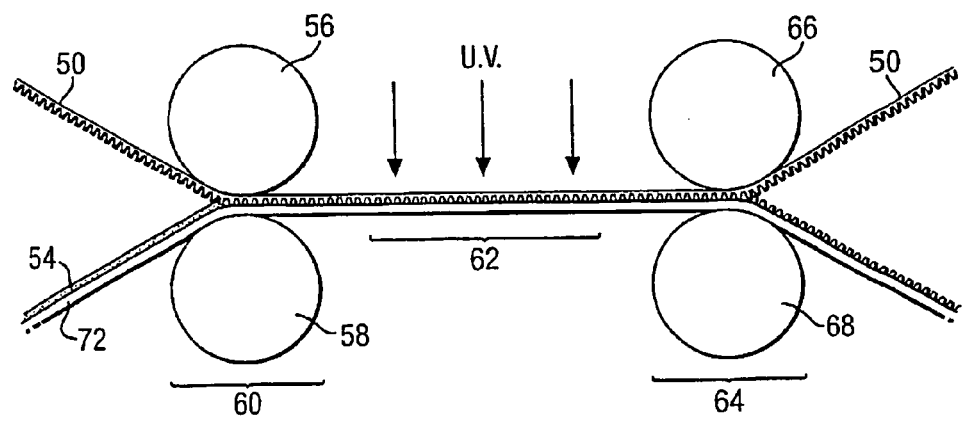
Figure 6A:
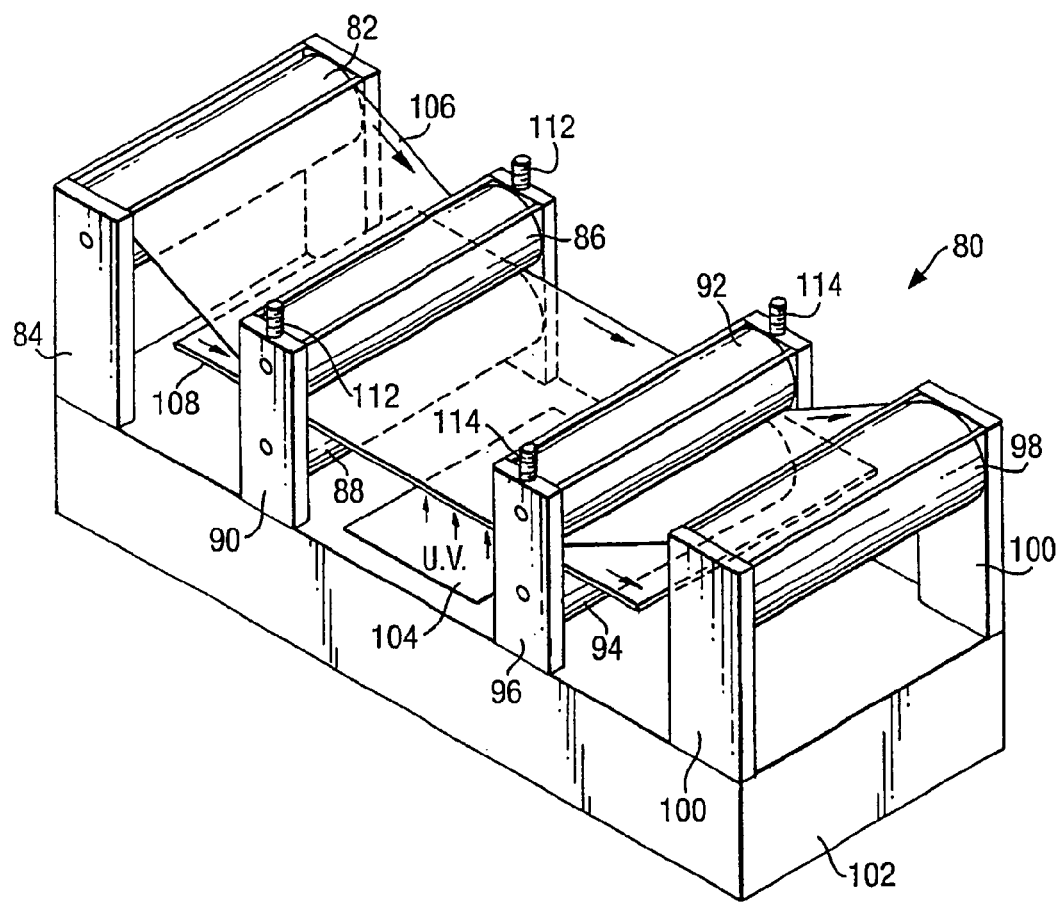
Figure 9:
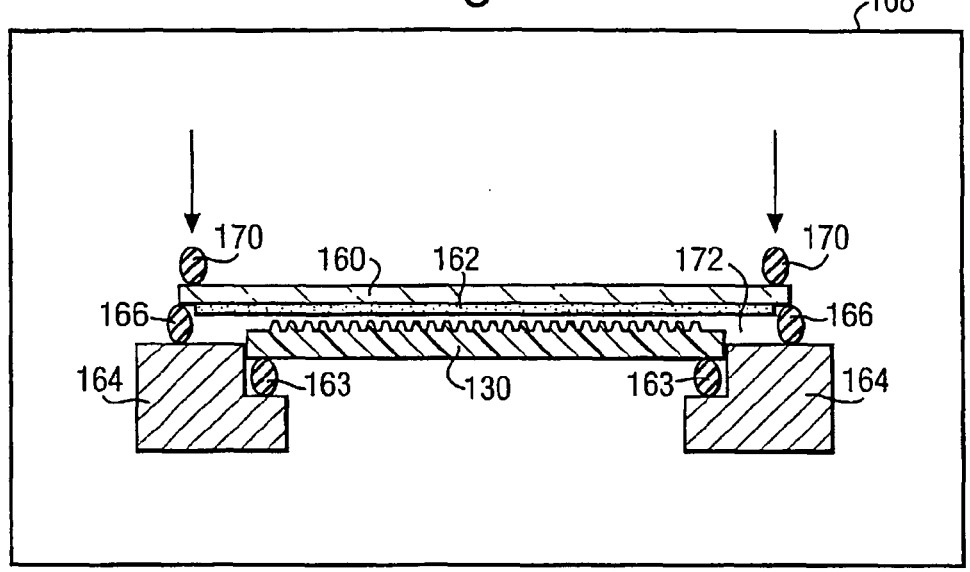
Figure 10:
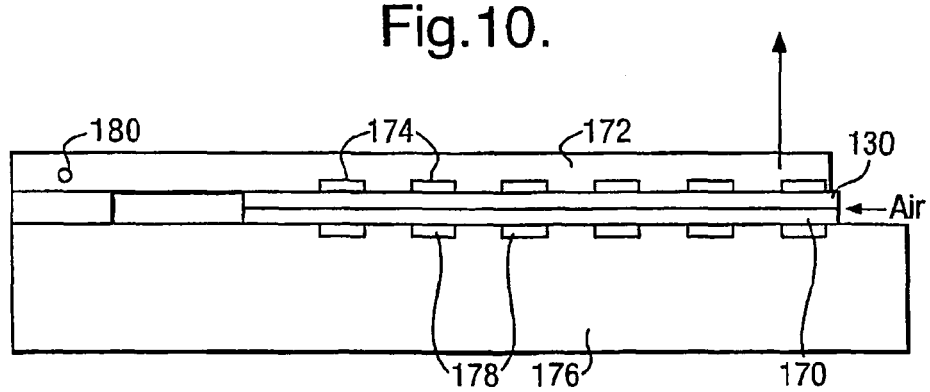
Figure 11:
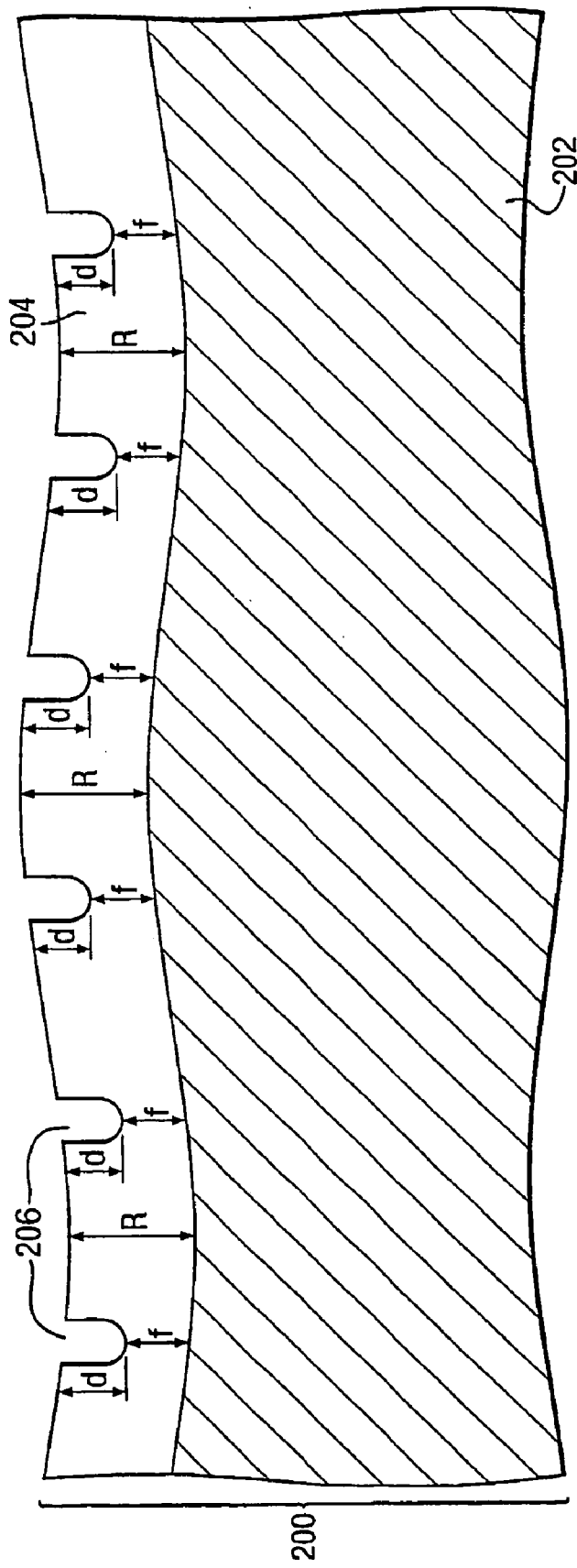
Figure 12:
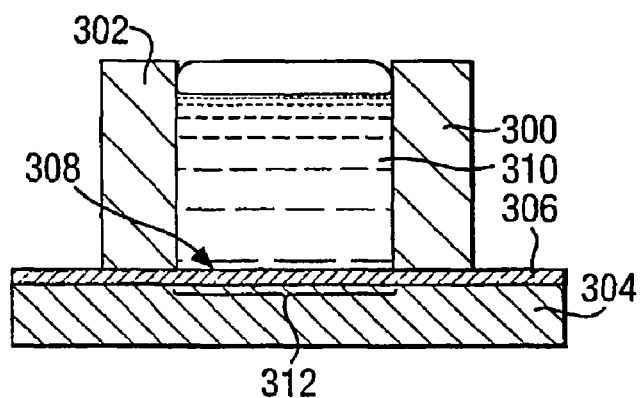
Figure 13:
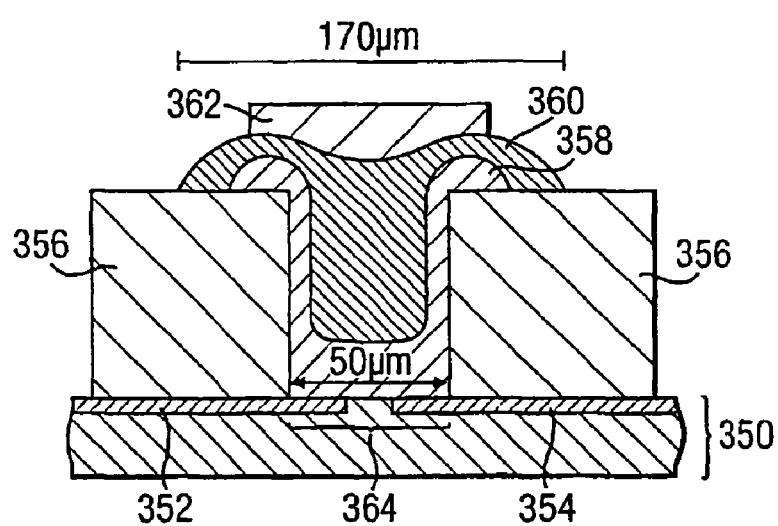
Figure 14A:
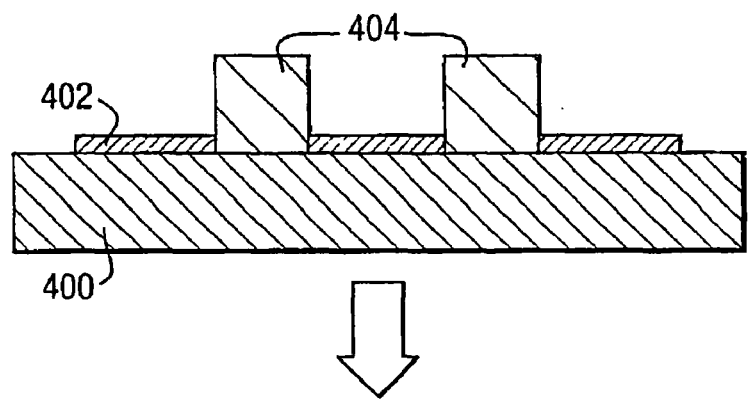
Figure 14B:
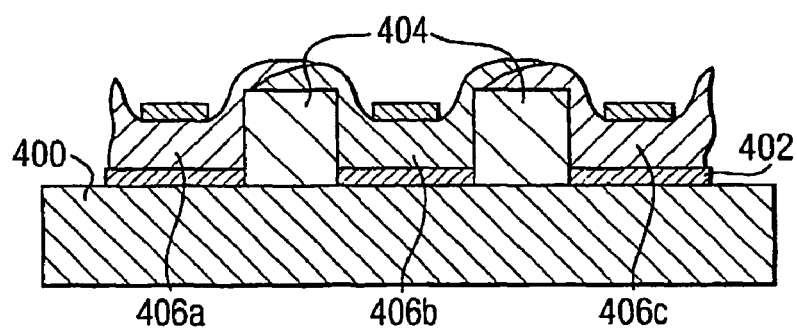
Figure 15:
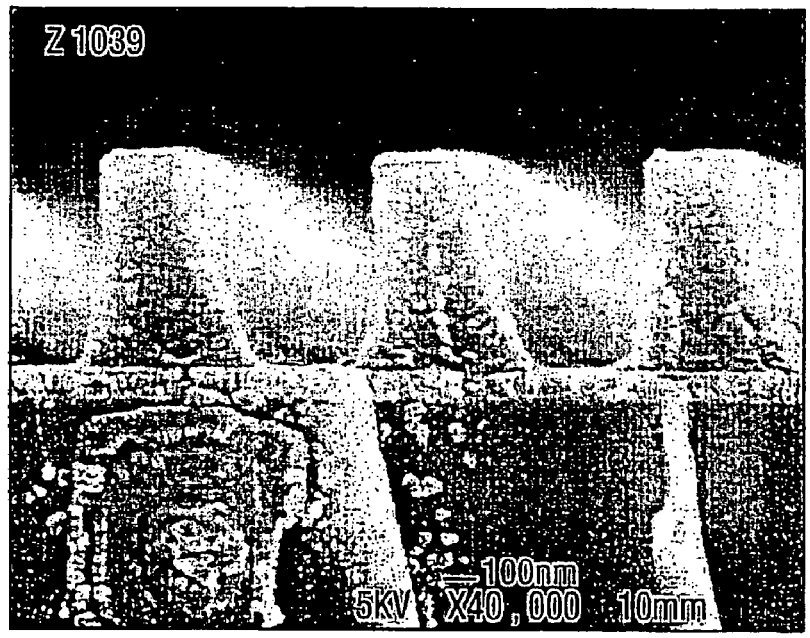
Figure 16:
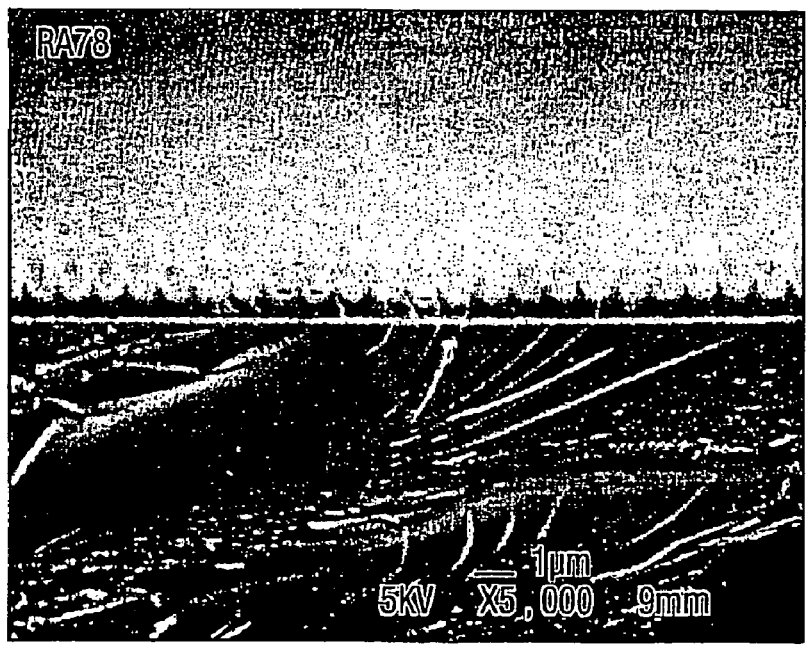
Figure 17:
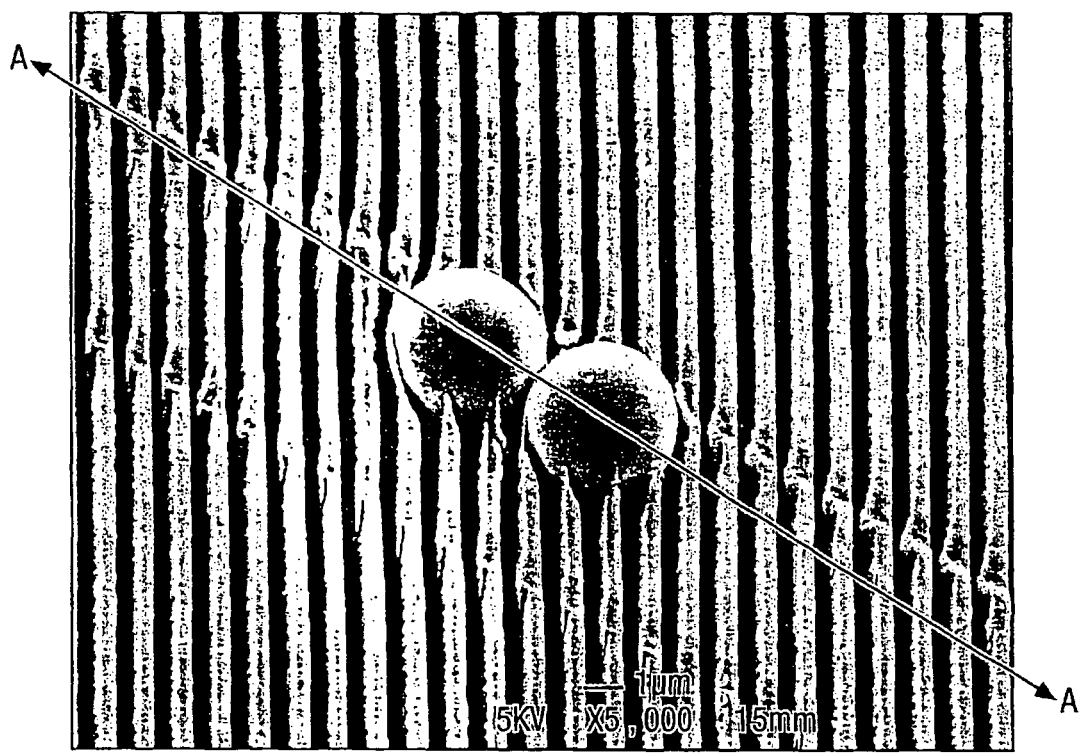
Figure 18:
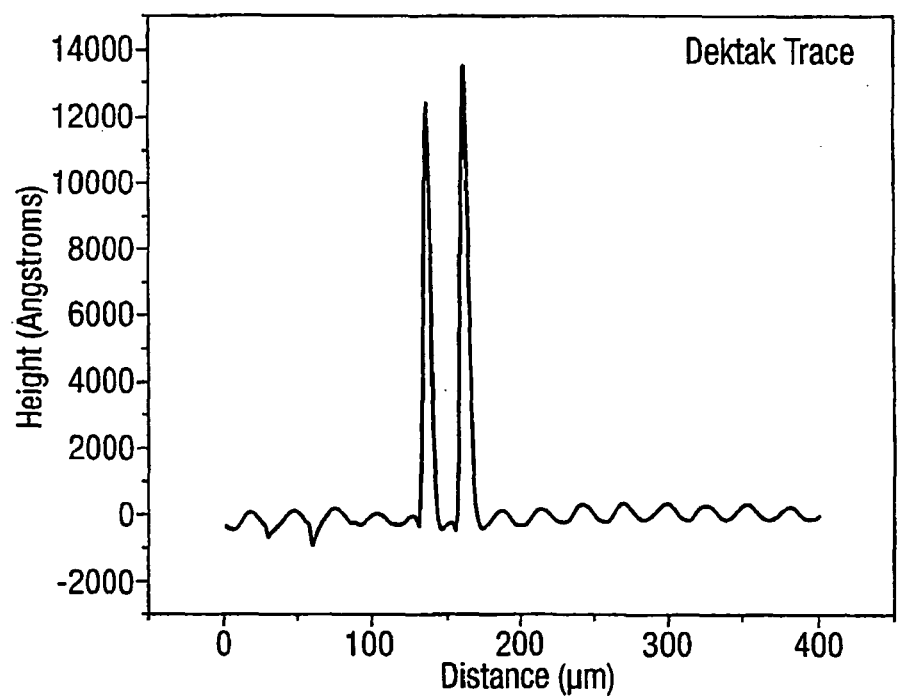
Figure 21A:
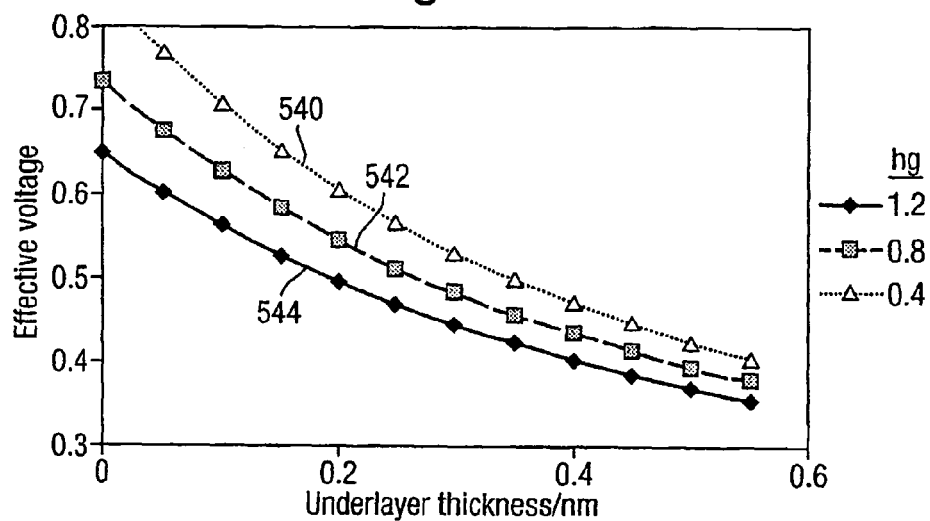
Figure 21B:
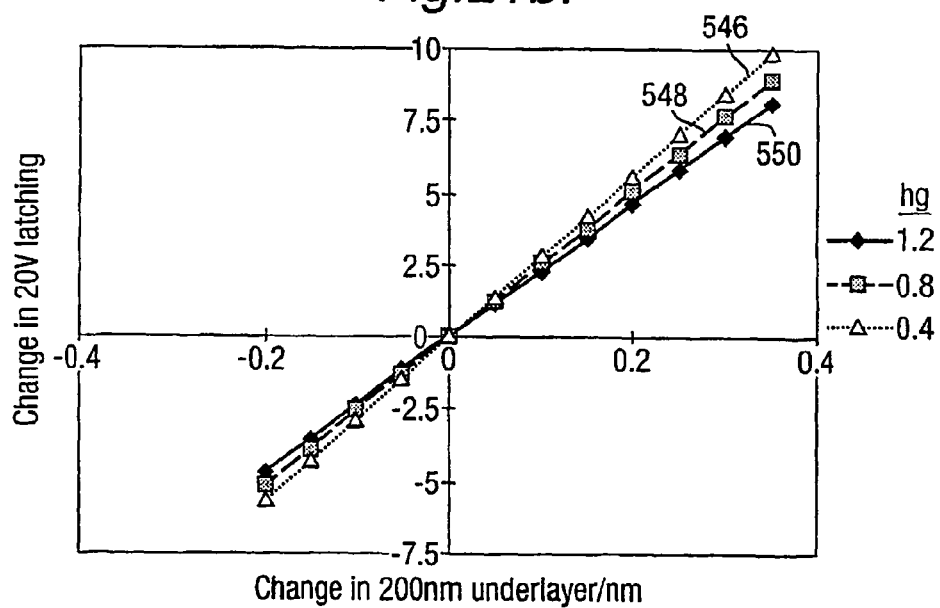
Figure 22A:
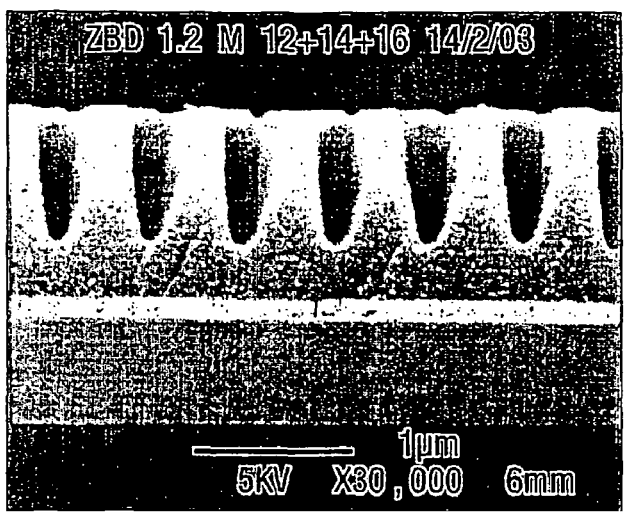
Figure 22B:
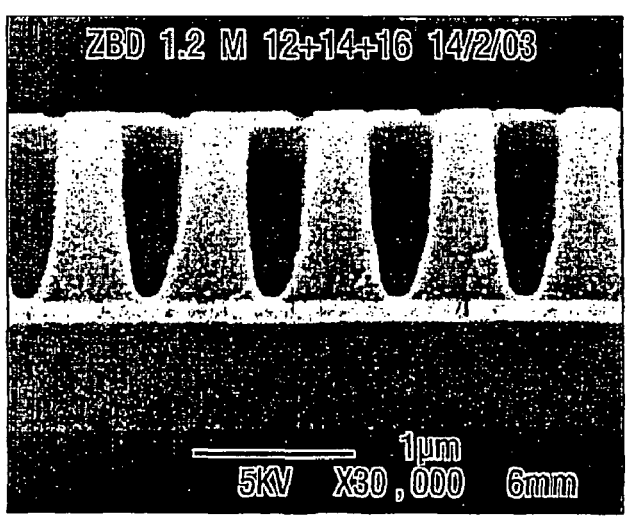
Figure 22C:
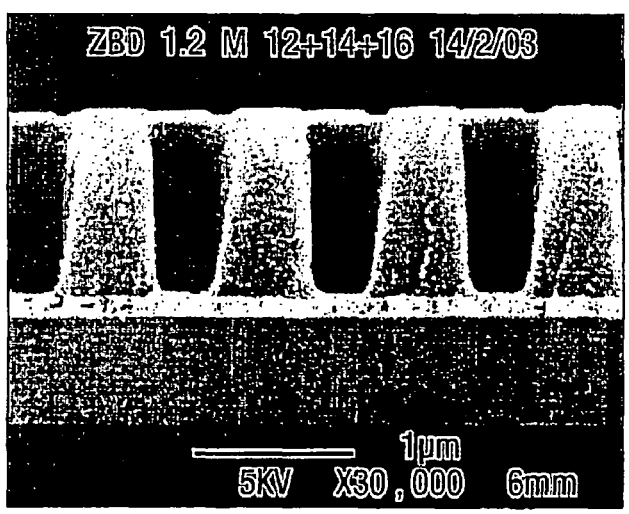
Figure 23A:
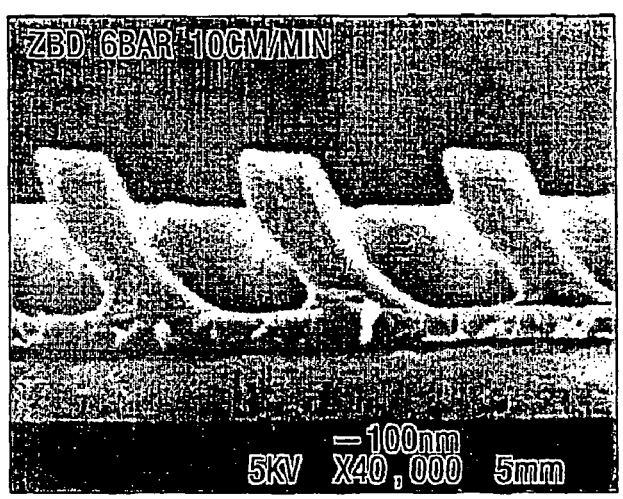
Figure 23B:
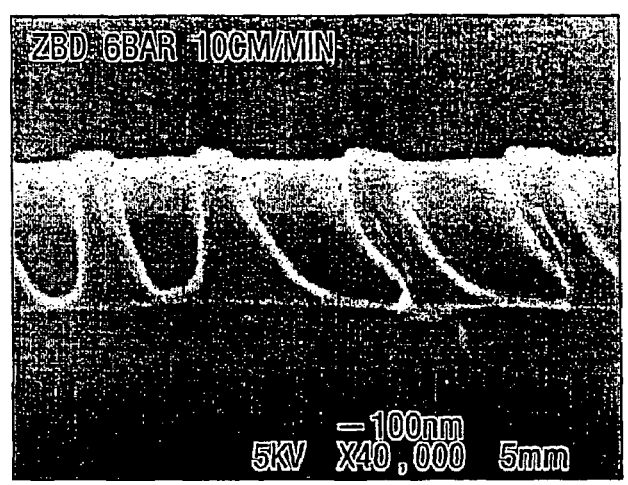
Figure 23C:
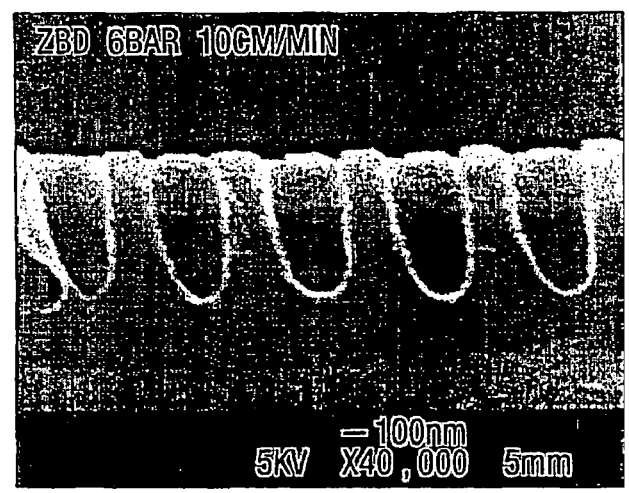
Figure 31A:
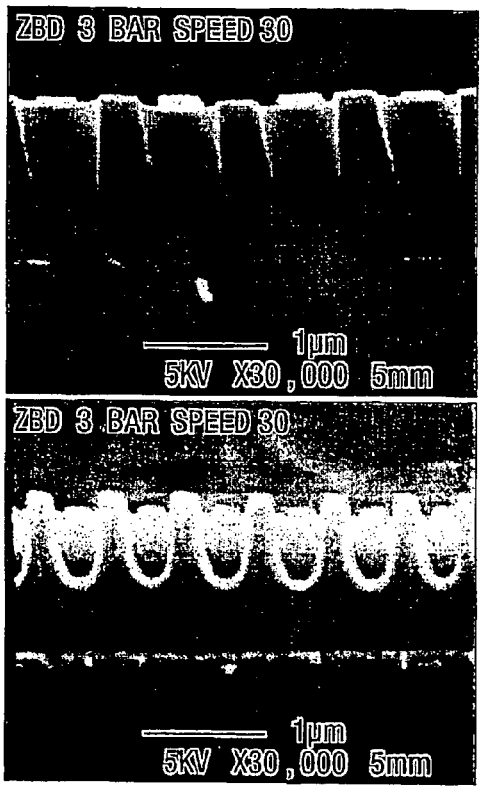
Figure 31B:
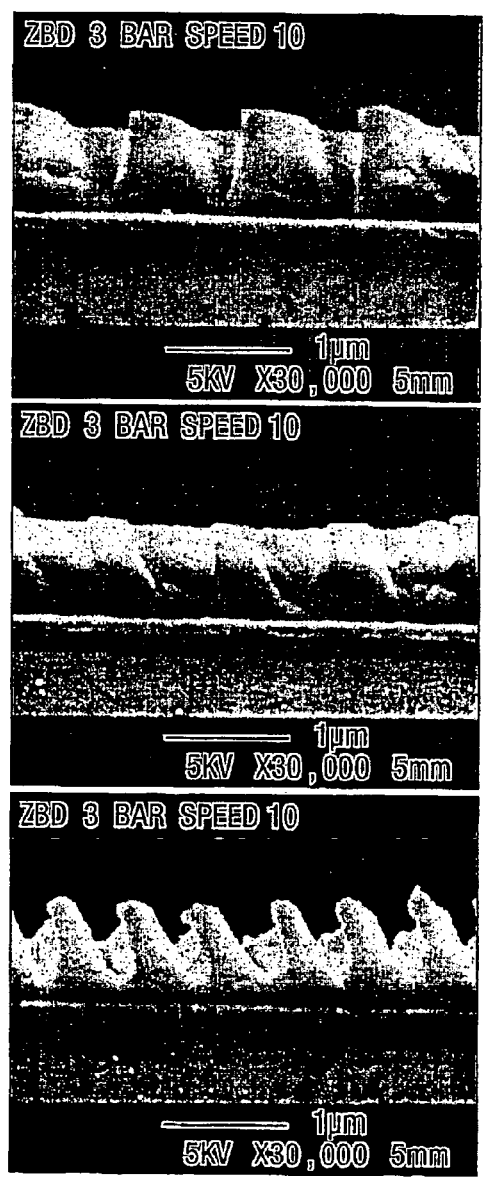
Figure 32:
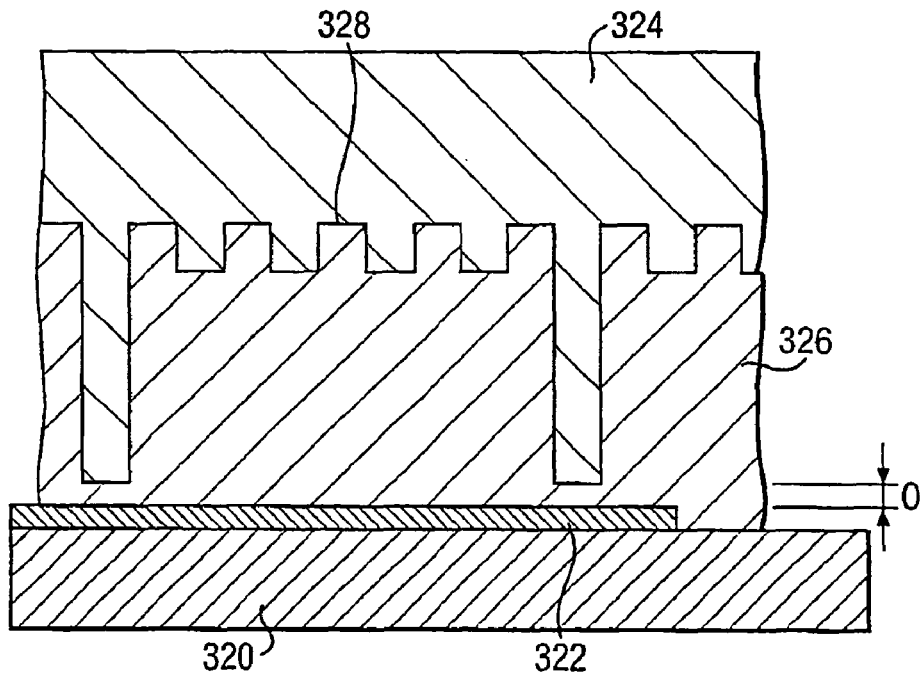
Figure 35:
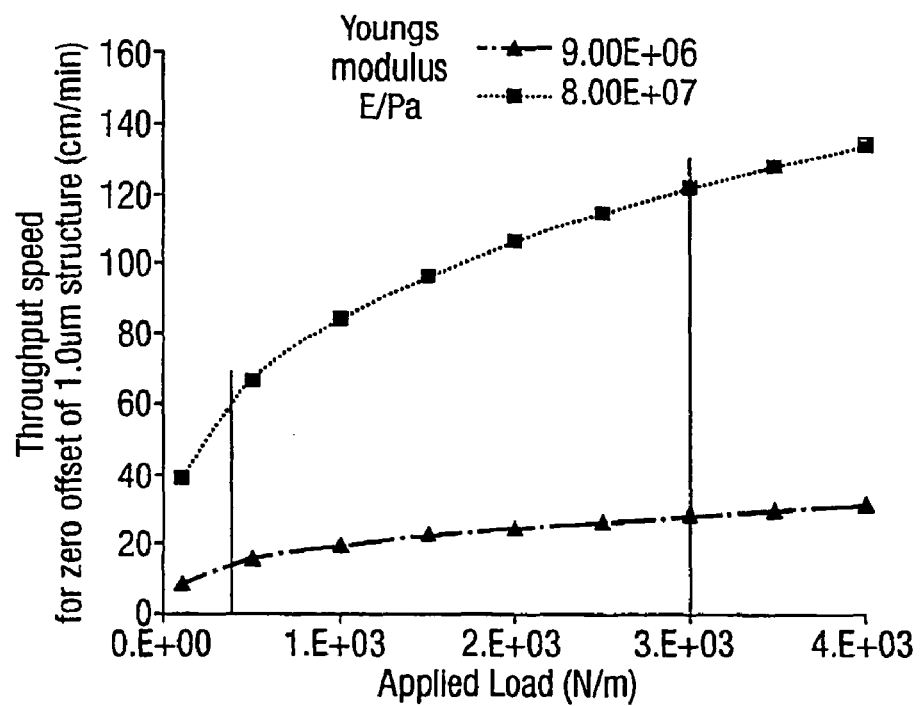
Figure 33:
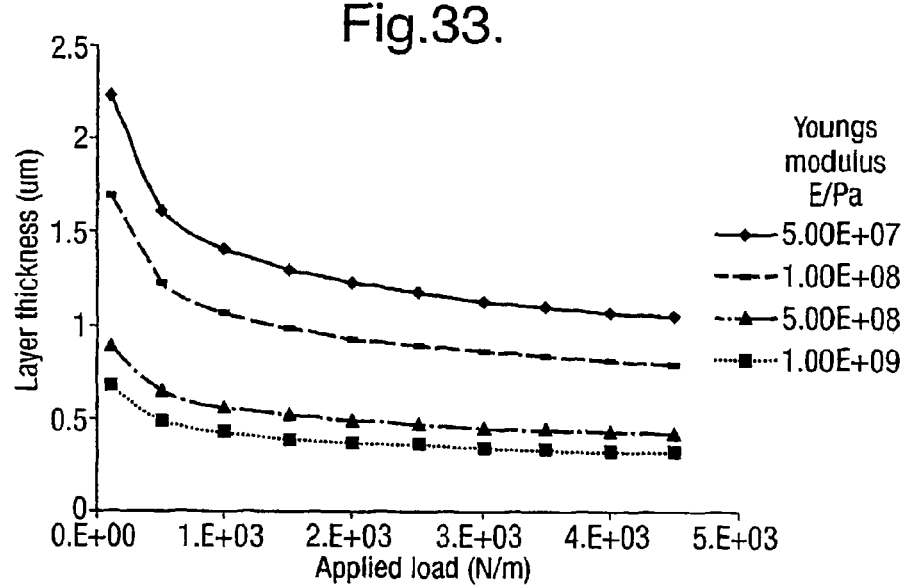
Figure 34:
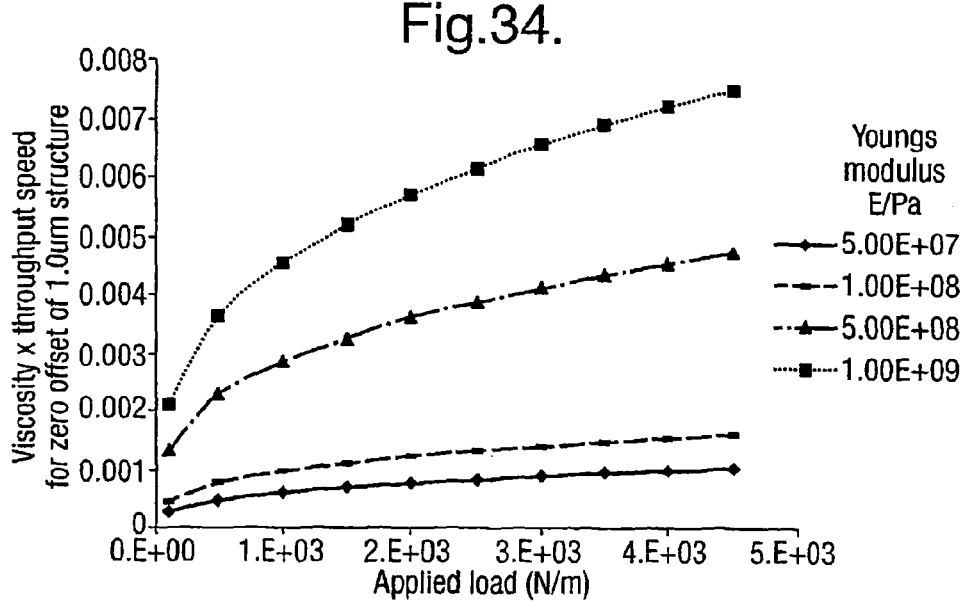
Figure 36A:
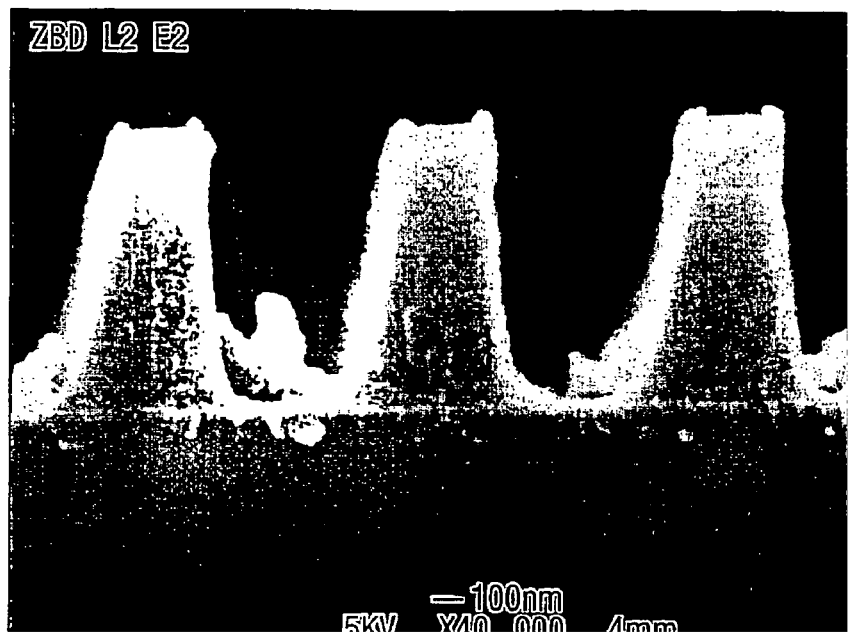
Figure 36B:
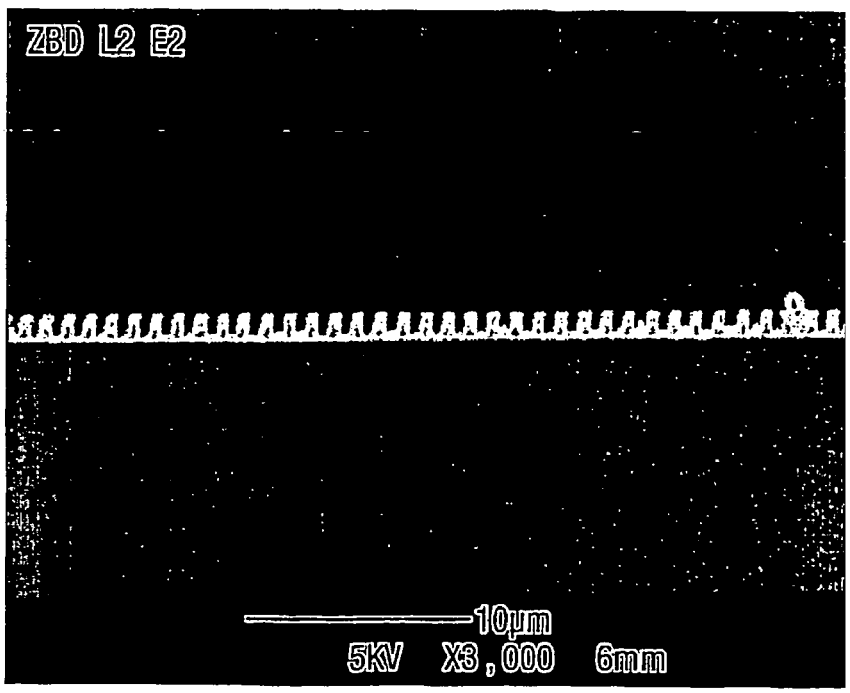
Figure 37:
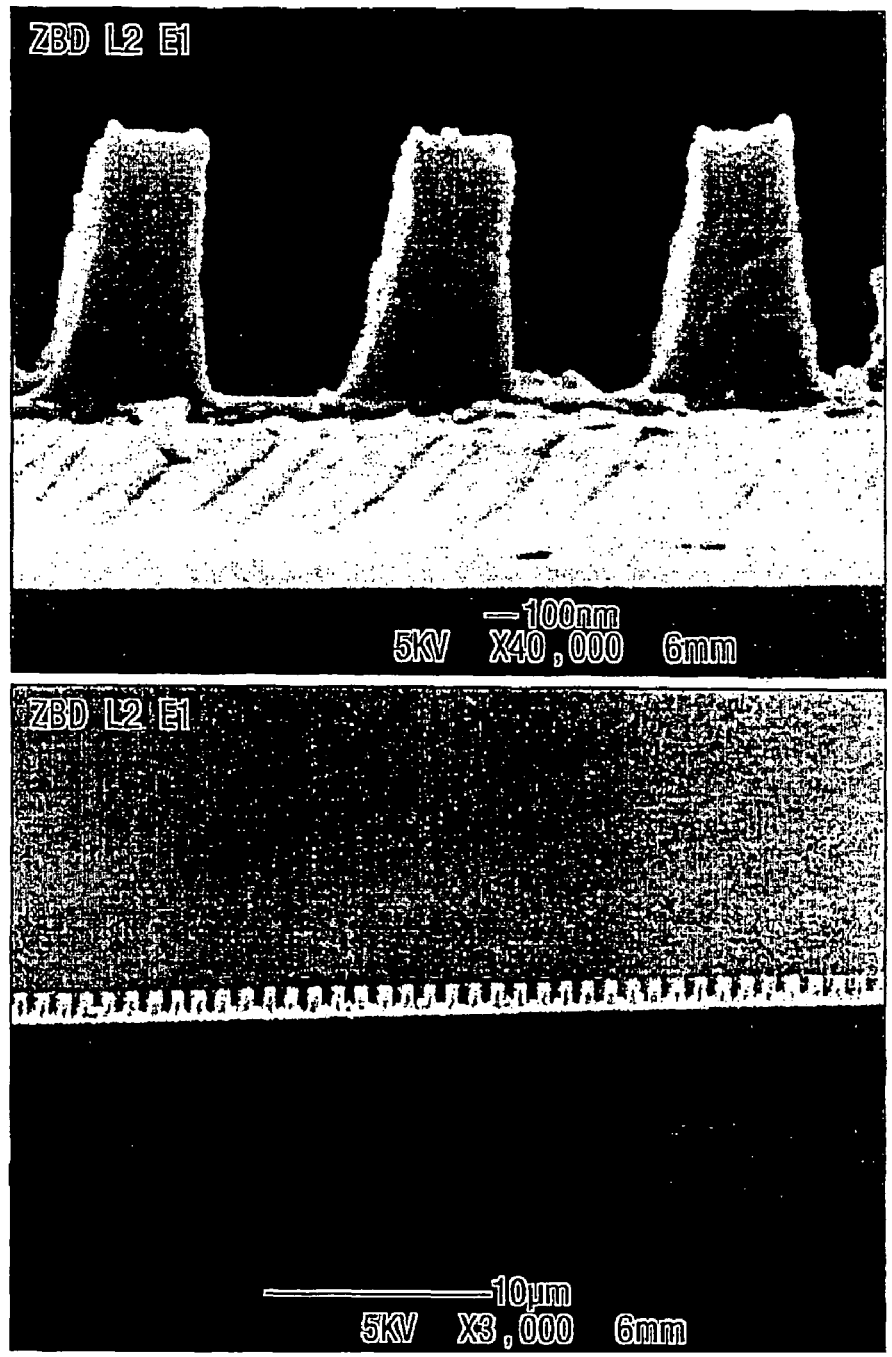
Figure 38:
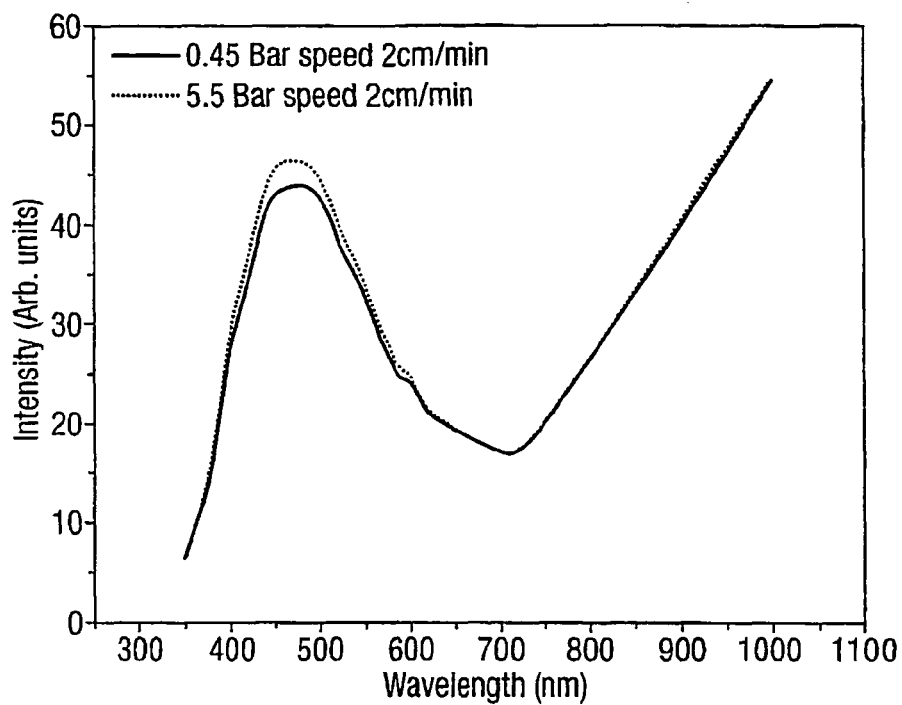
Figure 39:
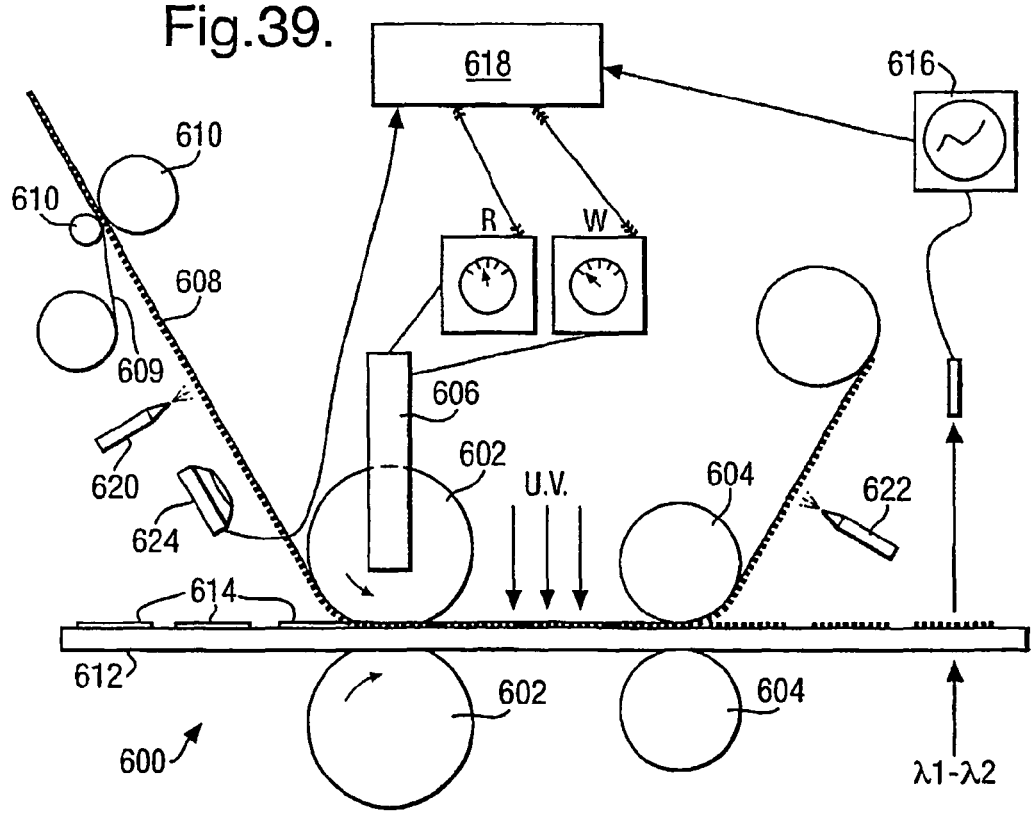

The invention will now be described, by way of example only, with reference to the following drawings in which;

FIG. 1 illustrates a grating structure formed in a layer of resin using a prior art embossing technique, FIG. 2 shows the steps in a method according to the present invention, FIG. 3 illustrates a method for producing a carrier film, FIG. 4 is a schematic representation of methods of lamination, curing and delamination using a substantially rigid substrate, FIG. 5 is a representation of a method of lamination, curing and delamination using a flexible substrate, FIG. 6a shows apparatus of the present invention and FIG. 6b is a graph of the pressure applied to a carrier film by such apparatus as a function of contact width, FIG. 7 shows a first vacuum based technique of lamination according to the present invention, FIG. 8 shows a second vacuum based technique of lamination according to the present invention, FIG. 9 shows a third vacuum based technique of lamination according to the present invention, FIG. 10 illustrates an alternative technique of delamination according to the present invention, FIG. 11 illustrates a structure formed in a layer of resin using an embossing technique according to the present invention, FIG. 12 shows a fluid constraining channel formed using the embossing technique of the present invention, FIG. 13 shows a transistor incorporating a well structure fabricated using the embossing process of the present invention, FIGS. 14a and 14b show an organic light emitting diode fabricated using an embossed wall structure of the present invention, FIG. 15 shows a sectional scanning electron microscope (SEM) image of an embossed copy made within the regime for zero offset, FIG. 16 shows a sectional SEM image of an embossed copy made outside of the regime for zero offset, FIG. 17 shows an embossed grating surface having spacer bead contaminants introduced prior to embossing, FIG. 18 shows the measured height profile of the grating surface of FIG. 16 along the line A-A, FIG. 19 shows the effect of offset and cell gap on the effective voltage and latching properties of a ZBD, FIG. 20 shows the effect of offset and grating mark to space ratio on the effective voltage and latching properties of a ZBD, FIG. 21 shows the effect of offset and grating amplitude on the effective voltage and latching properties of a ZBD, FIG. 22 are SEMs of a 1.2 µm amplitude grating masters composed of regions of 0.6 µm (FIG. 22A), 0.8 µm (FIG. 22B) and 1.0 µm (FIG. 22C) pitch, FIG. 23 shows SEM cross-sections of gratings produced from the 1.2 µm master using 6 bar embossing pressure (corresponding to approximately 30 kPa) and a throughput speed of V=10 cm/min (i.e. $1.66 \times 10^{-3}$ m/s), FIG. 24 shows SEM cross sections of the 1.2 µm gratings embossed at 0.45 bar for throughput speeds of 1 cm/min to 10 cm/min, FIG. 25 shows the dependence of the grating shape on throughput speed, measured from the SEMs of FIG. 24, FIG. 26 are SEMs of 0.9 µm and 1.0 µm amplitude grating masters, composed of 0.6 µm, 0.8 µm and 1.0 µm pitch regions, FIG. 27 shows SEM sections of 1.0 µm and 1.1 µm amplitude gratings embossed at a pressure of 0.45 bar and throughput speeds of 3 cm/min and 5 cm/min, FIGS. 28, 29 and 30 show the shape of the gratings from FIG. 27, measured using the SEM results, FIG. 31 shows SEMs of the embossed gratings produced using higher force and throughput speeds, FIG. 32 illustrates a pattern that can be embossed into a fixable layer, FIGS. 33 and 34 show theoretical predictions from equation (1) are shown, FIG. 35 shows a theoretical estimate for the upper limit of throughput speed for achieving the minimum offset condition;

FIGS. 36a) and 36b) show SEM images of an embossed grating from a second lacquer at an embossing pressure of 0.45 Bar and a speed of 2 cm/min, FIG. 37 shows SEM images of an embossed grating from a second lacquer at an embossing pressure of 5.5 Bar and a speed of 2 cm/min;

FIG. 38 shows the transmission spectra of the two embossed gratings shown in FIGS. 36 and 37, and FIG. 39 shows embossing apparatus of the present invention having a feed-back control loop.

Referring to FIG. 1, a structure 1 comprising a substrate 2 carrying a layer of resin 4 embossed with surface features 6 using a prior art technique is shown.

The structure 1 is produced by locating a layer of resin on the substrate 2. The substrate 2 carrying a layer of uncured resin is then passed through a pair of rollers. A nickel shim, bearing the inverse of the required surface pattern, is attached to the surface of the roller that is brought into contact with the resin layer. The resin is cured whilst in contact with the rollers using an appropriate radiation and/or heat source. Roller separation is kept constant so that, apart from any pattern written into the resin, the total thickness of the substrate 2 plus the resin film 4 is constant (i.e. the structure 1 has a substantially constant thickness h). Typically, the substrate 2 is flexible to ensure that the pressure applied by the rollers does not cause the substrate to shatter.

Due to manufacturing tolerances the thickness of the substrate 2 may be non-uniform, and the roller plus nickel shim diameter may also vary down the length of the roller. Therefore, generally, the absolute thickness of the embossed resin layer 4 varies in absolute thickness even for identical surface features 6; i.e. the layer thickness $f_1$ is different to $f_2$, which is different to $f_3$.

Typically the liquid crystal alignment will be provided by the surface profile being formed as a grating, i.e. a series of shaped peaks and troughs. Therefore the thickness of the resin layer will vary between the peaks and the troughs. However, when uniform switching properties are required it is desired that the resin thickness is identical at every peak and at every trough and that the surface profile is consistently repeated. In other words, a repeating base unit should be consistently repeated with the same thickness profile. Variations in thickness profile between repeating units is termed a variable offset and has the disadvantages given below. Alternatively, the embossed structure may be used as a spacer for adjacent regions, or for the opposing walls of the device. In such instances, the uniformity of the device is also dependent on the uniformity of the amplitude at the peaks and troughs across the device.

It should be noted that other surface alignment profiles may be used where a change in thickness is deliberate. However, wherever there is a repeating unit intended to impart the same liquid crystal alignment and switching properties as another unit any variation in offset (i.e. variation in the absolute thickness profile of the resin between repeated units) should be avoided.

Variations in the overall amplitude may be studied by illuminating the completed plate with a spatially uniform and narrow waveband light source. Variations in the overall thickness of the device then become clearly visible due to the interference fringes from the top and bottom surface. This method enables the offset to be characterised to within a quarter of the wavelength of the illuminating test source (typically about 120 nm).

Structures of the type shown in FIG. 1 are well known in the prior art, and have been used to obtain various optical effects. For example, it is known to produce diffraction gratings and holograms etc. In such structures, a variable offset does not affect the optical properties of the structure; the optical properties are dictated by the surface profile and not the total resin layer thickness.

As described above, a suitable surface profile (e.g. a grating structure) formed in a layer of resin can be used to impart alignment to liquid crystal materials and can thus be used in a liquid crystal device. However, in a liquid crystal device the absolute thickness of the resin layer (i.e. the amount of offset) in a particular area of the display will determine the switching voltage of the display in that area. This arises because as the thickness of the resin layer is increased, the proportion of the applied voltage that is dropped across the resin layer also increases thereby reducing the effective voltage applied to the layer of liquid crystal material. Variations of the offset across a liquid crystal display will thus produce non-uniform switching properties in a display device.

It can therefore be seen that prior art embossing techniques have disadvantages when they are used to fabricate grating structures for surface alignment of liquid crystal materials.

The shape of the surface features 6 and the degree of substrate thickness variation that are shown in FIG. 1 are for illustration purposes only. The surface features required to provide liquid crystal alignment are described in more detail elsewhere; for example see EP0856164 for the surface profiles required to produce a ZBD.

It should also be noted that the embossed resin layer is typically located on a substrate that comprises a pre-patterned electrode structure. This reduces manufacturing costs because transparent layers (e.g. glass or plastic) coated with indium tin oxide (ITO) are commercially available. Having electrodes that are integral with the substrate also prevents any unwanted optical effects that may arise from placing the electrode on top of the embossed resin layer, and ensures good conductivity as the electrode structure is kept substantially flat.

Referring to FIG. 2, a flow diagram of a method of the present invention is shown.

The step 10 comprises locating a layer of resin on a suitable substrate. For example, a glass substrate could be spin coated, nip-fed, silk screened, flexi-printed or ink-jet printed with a layer of UV curable resin. The resin thickness is preferably greater than the height of the tallest feature. The substrate may comprise a number of layers; for example it may comprise an electrically conductive layer (such as Indium Tin oxide or a metal) formed on a piece of glass. It may include a substantially uniform layer coated on to the electrode structure, deposited by spin coating, evaporation, sputtering, gas phase deposition, or printing method. The substrate may also comprise electronic elements, such as thin film transistors, driver circuits etc.

The resin may be deposited on only a part of the substrate. For example, the resin could be coated on regions of the substrate where an embossed structure is required. These regions could be separated by regions that are substantially free of resin, or carry a different type or kind of material. The selective coating of a substrate is particularly useful when resin free areas are required for subsequent production steps; for example when an edge seal of glue is used to bond a substrate carrying an embossed liquid crystal alignment layer to an opposing plate to form a liquid crystal device. Known inkjet printing techniques are one technique that could be used to selectively coat areas of the substrate with resin.

The step 12 comprises forming a carrier film having an inverse of the required surface profile, and a method of performing this step is described in detail with reference to FIG. 3. To aid subsequent release of the carrier film from the resin coated substrate, the formulation of the carrier film surface is preferably selected such that it does not adhere strongly to the resin. The carrier film can be metallized with Al, Ni, or Cr or treated with a low energy material (for example a fluorinated polymer such as plasma polymerised PTFE) to aid release from the cured resin.

The step 14 comprises laminating the carrier film and the resin coated substrate. This step may be performed by passing the carrier film and substrate through a pair of rollers as described with reference to FIGS. 4-6. Vacuum based techniques of the type described with reference to FIG. 7-9 may also be used.

To ensure the offset variability of the resulting resin layer is minimised, the pressure applied to the carrier layer and substrate during lamination should be kept constant. For a typical carrier layer and resin with a viscosity of 50 cps, a pressure greater than 100 Pa and less than 10 Mpa should be applied. The pressure should be applied as uniformly as possible. A feedback mechanism may be included into the apparatus to ensure that the pressure applied remains constant during the embossing process. To prevent contamination by dust, the lamination step may be performed in a clean atmosphere such as a class 1 enclosure. Alternatively, anti-static air-brush and/or other similar methods could be used to remove dust from the film immediately prior to its contact with the substrate and/or fixable material.

After lamination, a cure step 16 is performed. The precise cure technique depends on the type of resin used and can be performed remotely to the lamination step. Typically, curing is achieved via illumination with UV or IR radiation. A curing step using radiation of two or more different wavelengths may also be used to cure the resin. For example, a first wavelength of radiation could be applied to cure a portion (e.g. the surface) of the resin and a second wavelength of radiation could be applied to cure a second portion of the resin (e.g. the bulk). Alternatively the intensity could be varied.

Alternatively, a heat source may be used as the cure step.

Unlike prior art techniques, fast cure times are possible since UV or heat can be readily applied over a large area. Since the laminate is relatively stable with time, the curing step could also be performed at some time after lamination. The present invention thus has an advantage over prior art techniques in which the cure step is performed whilst the patterned roller is in contact with the resin.

It should be noted that it may be desirable to cure only part of the resin. For example, UV radiation could be passed through an appropriately patterned mask. In this manner regions of uncured resin would remain that, after the delamination step, could be washed away using an appropriate solvent. As described above, having areas of the substrate free from resin can prove advantageous for certain applications.

It is also possible to perform a pre-cure step prior to lamination. For example, certain areas of resin on the substrate could be cured before embossing. This would enable layers to be produced without the pattern embossed in certain regions (e.g. in the vicinity of an inter-pixel gap).

Once cured, a delamination step 18 can be performed to remove the carrier film from the cured resin layer. Separation is achieved by peeling off the carrier film from the resin layer. As described with reference to FIGS. 4-6 this could be performed using rollers or, as described with reference to FIG. 10, using a vacuum clamp and/or an air jet. The delamination step can be performed at some time after lamination; for example, the carrier film laminate structure could be placed on a roll and transported to an appropriate LCD manufacturing facility.

As with the lamination step 14, the separation step 18 may be performed in a clean atmosphere to prevent contamination of the patterned resin coated substrate. The carrier film may be used once, or may be cleaned and re-used several times.

Finally, the substrate having the required surface profile formed therein may be used (step 20) as a cell wall in a liquid crystal device, such as a ZBD. Additional layers, for example homeotropic treatments, may be applied to the cured resin layer prior to device assembly in any conventional manner.

Referring to FIG. 3, one method of producing a carrier film is shown. A flexible plastic sheet 40 under slight tension is passed by a patterned roller 42 and four soft rollers 44. The patterned roller 42 has a metal shim 46 around its circumference containing the required pattern.

A nip of UV curable resin 48 is applied to the plastic sheet 40 prior to it being brought into contact with the patterned roller. As described above, the plastic sheet may have a non uniform thickness and the diameter of the roller may vary along its length. Hence, the resin thickness is selected to be greater than the variation in substrate thickness and roller non-uniformity (e.g. 25 µm and thicker). Whilst the resin is in contact with the patterned roller, the UV curable resin is cured by irradiating with UV radiation and a carrier film 50 is thus produced. The carrier film 50 is of constant thickness (i.e. the thickness h is invariant) but the offset varies along the film. It should also be noted that imperfections along the length of the roller will mean that although the thickness h is substantially invariant along the film, the thickness h may vary across the film.

Alternative methods of forming a carrier layer are also known, for example a thermoplastic film could be heated above its glass transition temperature whilst it is in contact with a patterned roller.

Referring to FIG. 4, a method of lamination, curing and delamination for a glass substrate is shown.

In the lamination region 60, a first roller 56 and a second roller 58 force a carrier film 50 in to contact with a layer of uncured UV curable resin 54 coated on a glass substrate 52. The first roller 56 and the second roller 58 are biased toward one another, for example using springs or air pistons, such that a constant pressure is applied during the lamination process. A pressure in the range of 0.1 to 5 psi is appropriate when using resin with a viscosity of 2-10000 cPs (1 poise (Ps)=0.1 pascal second).

The glass substrate 52 will have a certain level of thickness non-uniformity, which is typically of the order of ±0.2 μm per 20 mm for supertwist nematic quality glass but could be higher for unpolished glass. Therefore, to ensure a substantially constant pressure is applied along the length of the roller during lamination the first roller 56 and the second roller 58 are deformable. However, it must be ensured that the rollers are not too soft as this may allow the roller to deform substantially thereby introducing stress into the carrier film. The rollers should provide the required level of deformation and take up any non-uniformity in the thickness of the laminate (e.g. due to variations in glass thickness).

Rollers having a Shore A hardness of greater than 50, or greater than 55, or greater than 60, or greater than 65 may be used. Rollers having a Shore A hardness less than 90, or less than 85, or less than 80, or less than 75 could be used. The rollers may be formed from a single material, or may have an outer deformable surface mounted on a rigid (e.g. metal) core.

Once laminated, the resin 54 is cured in the curing region 62 by exposure to an appropriate source of UV radiation. UV lamps suitable for such a process are known to those skilled in the art.

The carrier film 50 is peeled from the cured resin layer in the de-lamination region 64. A second de-lamination roller 68 supports the glass substrate 52, whilst the carrier film 50 is lifted and guided away from the resin-coated substrate in a controlled manner using a first de-lamination roller 66. This technique ensures a smooth de-amination process preventing damage to the structure formed in the resin. A structure 70 comprising a glass substrate/electrode structure with a patterned resin layer is thus produced.

Referring to FIG. 5, a method of lamination, curing and delamination for a flexible plastic substrate is shown. Similar elements to those described with reference to FIG. 4 are given like reference numerals.

In common with the method described with reference to FIG. 4, a lamination region 60, a curing region 62 and a de-lamination region 64 are provided. A flexible plastic substrate 72 with a layer of uncured resin 54 is laminated with the carrier film. The plastic substrate 72 is more de-formable than the glass substrate 52 used in the method described with reference to FIG. 4. Therefore the rollers 56 and 58 do not need to be as deformable as those used when lamination using a glass substrate is performed because the plastic substrate itself will deform to some extent. A first roller 56 and a second roller 58 having a shore A hardness of 60 would be suitable. It is assumed that a shore hardness of 60 approximates to a Young's modulus of 2 MPa.

Referring to FIG. 6a, embossing apparatus 80 for implementing the method described with reference to FIG. 4 is shown.

A roll of carrier film 82 is rotateably mounted between a first pair of support arms 84. A first lamination roller 86 and a second lamination roller 88 are mounted on a second pair of support arms 90. A first de-lamination roller 92 and a second de-lamination roller 94 are mounted on a third pair of support arms 96. A roll 98 to receive carrier film is rotateably mounted on a fourth pair of support arms 100. The support arms 84, 90, 96 and 100 are attached to a base 102. A UV radiation source 104 is mounted in the base 102 between the a second pair of support arms 90 and the third pair of support arms 96. The second lamination roller 88 is rotatably mounted at a fixed height from the base 102, and the first lamination roller 86 is biased toward the second lamination roller SS by a pair of air pistons 112.

Each air piston 112 exerts a force of 560 N for an input gas pressure of 7 bar, and the total downward force applied by the first lamination roller is thus 1120 N when each piston receives a gas pressure of 7 bar. For a rubber roller with a shore "A" hardness of 60 the rubber deforms a produce a contact width of 15 mm, and for a substrate width of 355 mm a pressure of 0.21 N/mm² will thus be applied to the carrier film. Different hardness rollers will obviously deform to a greater or lesser extent, and FIG. 6b shows the estimated pressure exerted on the carrier film as a function of contact width for an input gas pressure of 7 bar (see curve 122) and an input gas pressure of 1 bar (see curve 120).

The first and second delamination rollers 92 and 94 are arranged in a similar configuration to the corresponding lamination rollers 86 and 88. Pistons 114 bias the first delamination roller 92 toward the second delamination roller 94. Pressure may be applied during the delamination process, although this is not necessary to ensure controllable delamination occurs.

Prior to use, carrier film 106 is fed from the roll of carrier film 82 through the lamination and delamination rollers and received by the roll 98. The carrier film 106 is held under slight tension and the unpatterned side of the carrier film is held in contact with the first lamination roller 86 and the first delamination roller 92.

In operation, a resin coated substrate 108 is fed into the apparatus through the first pair of support arms 84 and passes through the lamination rollers where it is laminated with the carrier film. As described above, the lamination rollers are formed from rubber of a shore A hardness of 60 and a pressure of 0.21 N/mm² is applied during lamination when using a 1 μm thick layer of resin having a viscosity of 50 cps.

The laminate is then exposed to radiation from the UV radiation source 104 to cure the patterned resin before it passes through the delamination rollers. Finally, the substrate 108 is removed from the apparatus through the fourth pair of support arms.

Using apparatus of the type described with reference to FIG. 6a provides a resin layer that has a surface profile with a predetermined offset which is capable of providing uniform surface alignment to liquid crystal materials. The ability to minimise variations in offset across an LCD alignment surface provides improved device performance and uniformity. The apparatus can also be extended to provide large area devices and allows low cost, mass production, of liquid crystal devices.

It should be noted that in all the examples described above the grating pattern is shown with grooves parallel to the roller axis. However, in practice it is often preferable to orient the grooves perpendicular to the roller axis. Although UV curable resin is described in the examples given herein a person skilled in the art would recognise the many alternative fixable materials that could be used. The manner of fixing the material (e.g. curing using visible, V, x-ray, e-beam or heat) would also depend on the type of fixable material employed and would be well known to a person skilled in the art.

It is possible to perform the embossing technique at any temperature in order to reduce or increase the viscosity of the fixable material as required. For example, heated, or cooled, rollers may be employed.

Although the desired operating parameters are described above for roller based methods of the type described with reference to FIGS. 4-7, the parameters (e.g. viscosity, roller radius and hardness, applied pressure etc) are interdependent. Hence, a more viscous fixable material will require the application of more pressure for a longer period of time in order to be embossed with a pattern having the desired offset.

For a nip fed system, the interdependency of these parameters can be described, as an approximation only, by the expression (in SI units):

$$T = 3.12(\mu V)^{0.6} W^{-0.2} (4E/3)^{-0.4} R^{0.6} \quad (1)$$

where T is the coating thickness, W is the applied load per unit roll length, E is the Young's modulus of the elastomeric material forming the surface relief structure on the carrier film, R is the roller radius, V is the linear speed of the laminate through the pair of rollers and at is the viscosity of the fixable material. Similar relationships could be derived for systems in which the fixable material is printed to the required depth onto the substrate prior to embossing. The various parameters of the system could thus be altered as required to provide embossing in accordance with this invention. The thickness T is the sum of the amplitude of the surface relief structure A and the desired offset O.

Referring to FIG. 7, a vacuum embossing technique is shown.

As shown in FIG. 7a, a carrier film 130 of the type described with reference to FIG. 3 is attached to a plastic base film 132. A resin coated substrate 134 is located adjacent to the carrier film 130. The carrier film 130, base film 132 and resin coated substrate 134 are placed in a vacuum chamber 136.

The vacuum chamber is evacuated to remove the air. The free ends 138 and 140 of the plastic base film 132 are melted and pressed together to form an airtight seal around the substrate. As shown in FIG. 7b, the substrate is thus effectively located in an evacuated plastic bag. The chamber is then pressurised so that the carrier film (i.e. embossing tool) is pressed into the resin due to atmospheric pressure; see FIG. 7c. The resin can be UV cured in situ, or stored in the bag and cured at a later time. This technique has the advantage of applying uniform pressure across the carrier film.

Referring to FIG. 8, a second vacuum embossing technique is illustrated.

The method involves placing a glass substrate 150 coated with a thin layer of curable resin 152 on a flat surface 154. A carrier film 130 of the type described with reference to FIG. 3 is located on an o-ring 156 on top of the flat surface 154.

The air is evacuated from the area 158 between the carrier film 130 and the flat surface 154, thereby bringing the carrier film 130 into hard contact with the resin 152. The resin 152 is then cured with UV light. The amount of evacuation is sufficient such that the external atmospheric pressure uniformly drives the carrier film into the resin with the force required to minimise offset variation and also to give the required offset thickness.

Referring to FIG. 9, a third vacuum embossing technique is illustrated.

A carrier film 130 of the type described with reference to FIG. 3 is located on an o-ring seal 163 that is mounted on an external support 164. A glass substrate 160 having a layer of resin 162 coated thereon is mounted on a second o-ring seal 166 that is also mounted on the support 164. This apparatus is located in a vacuum chamber 168.

The vacuum chamber 168 is evacuated to remove the air from the area 172 between the carrier film 130 and the glass substrate 160. Pressure is applied on top of the substrate edges via a third o-ring 170 to ensure the o-ring 166 provides a good seal. The chamber is then let up to atmospheric pressure, which causes uniform atmospheric pressure to be applied to laminate the carrier film and the resin coated substrate. The resin is then UV cured.

Referring to FIG. 10, a technique for removing (or de-laminating) a carrier film 130 from a (cured) resin coated substrate 170 is illustrated. An upper arm 172 holds the carrier film 130 using vacuum pads 174. A lower arm 176 holds the resin coated substrate 170 using vacuum pads 178. The upper arm 172 is mounted to the lower 176 via a pivot 180. In operation, the upper arm 172 is pivoted about the pivot 180 such that the carrier film 130 is slowly peeled from the substrate. A jet of air may also be applied to aid release.

With reference to FIG. 11, a structure 200 fabricated using an embossing method of the present invention is shown. The structure 200 comprises a substrate 202 carrying a layer of resin 204 and has surface features 206 formed therein.

It can be seen that the repeated surface features 206 are of constant depth (d), have a trough with a predetermined thickness (f) of resin and that the unpatterned portion of the layer of resin 204 is a predetermined thickness (R). The offset, in this case the thickness (f), associated with the resin layer is thus substantially invariant. Once again it should be emphasised that the shape of the surface features 206 and the degree of substrate thickness variation that are shown in FIG. 11 are for illustration purposes only. It should also be noted that in certain circumstances the thickness (f) of the resin at the bottom of the trough may be required to be minimal (i.e. near zero).

A skilled person would recognise that the present invention may be used to provide embossed structure for use in applications other than the provision of liquid crystal alignment layers. Physical structures, such as pillars, walls or "waffles" may be also embossed in the resin. These physical structures may be used to space the two opposed cell walls forming an LCD to act as "black" matrix between adjacent pixels and/or to separate different areas of the device where the liquid crystal properties differ. Furthermore, the embossing technique could provide refractive, diffractive, diffusive, scattering or holographic elements to improve the optical properties (e.g. viewing angle, reflectivity, contrast, colouration, transmissivity etc) of the LCD devices.

The embossing technique of the present invention can also be used in many applications other than liquid crystal devices. A few of the numerous electronic and electro-optic applications in which embossed layers fabricated in accordance with the method of the present invention could be used are described below.

Firstly, embossed structure fabricated in accordance with this invention could be used in any situation where it is necessary to constrain, control or align fluids. For example, in electrophoretic displays or electrochromic modulators or in the field of micro-fluidics (often termed lab-on-chip technology).

In micro-fluidic systems an electric field is used to move fluids constrained in channels. As shown schematically in FIG. 12, side walls 300 and 302 of a well defined height could be embossed in a layer of fixable material located on a substrate 304 that has an uppermost electrode layer 306. The embossing technique of the present invention would permit the side walls to be formed from a layer of fixable material and could have a near zero offset; hence there would be an almost zero thickness of fixable material in the intermediate region 308 between the side walls. A fluid 310 could then be located in the area 312 defined by the side wall 300 and 302. As the thickness of fixable material between the electrode 306 and the fluid 310 is minimal (i.e. the layer of fixable material is arranged to have a near zero thickness in the intermediate region 308) there will be a minimal voltage loss across said fixable material.

Secondly, the embossing technique of the present invention can be used in the process of forming a number of different types of electrical structure. As an example, FIG. 13 illustrates a transistor formed using an embossed well structure.

To produce the transistor shown in FIG. 13 a substrate 350 carrying a first electrode 352 and a second electrode 354 is coated with a layer of photo-curable polymer. The technique of the present invention is used to emboss a structure comprising a wall 356 surrounded by near zero thickness regions in said photo-curable polymer. A first layer of electrically active material 358 and second layer of electrically active material 360 are then placed (e.g. by inkjet printing) in the well formed by the wall 356. A top electrode 362 is placed (e.g. by ink jet printing) in contact with the upper surface of the second layer of electrically active material 360. The selection of a suitable top electrode 362, first and second electrodes 352 and 354 and first and second layers of electrically active material 358 and 360 can thus provide transistor operation.

The active portion of the transistor shown in FIG. 13 is accurately defined by the sidewall 356. The embossing technique is not limited to the 170 µm resolution of the inkjet printing, hence the active part of the transistor can be made much smaller (e.g. 50 µm) and the size thereof can be accurately defined. Furthermore, the use of a near zero offset embossed layer does not inhibit electrical contact between the first and second electrodes 352 and 354 and the first layer of electrically active material 358 in the central region 364.

A further use of the present invention is in the field of organic light emitting diodes (OLEDs), which includes polymer or small molecule light emitting diodes (PLEDs), of the type described by Humbs et al in the proceedings of Eurodisplay 2002, page 145 to 147. The technique of inkjet printing the various layers required to form the OLED is limited by the resolution of the inkjet printer which is currently around 5 dots per millimeter (i.e. 200 µm features).

Referring to FIG. 14, it can be seen how a high resolution colour device can be made. FIG. 14a shows a substrate 400 carrying electrodes 402. A wall structure 404 is embossed onto the substrate and forms a container for each polymer, thereby defining the pixel structure. The height of the wall will be in the range 0.1 µm to 50 µm, its width will be between 10 µ and 40 µm, and the separation between walls is around 40 µm to 200 µm.

Semiconducting polymers 406 suitable for emission of red (polymer 406a) green (polymer 406b) and blue (polymer 406c) wavelengths are then ink-jet printed into each container as shown in FIG. 14b. The polymers from adjacent pixels will overlap on top of the embossed polymer wall, but this causes no degradation of the performance of the device. The near zero offset of the embossed layer in the region between the walls ensures good contact between the electrodes 402 and semi-conducting polymer 406 and hence permits formation of the diode junction.

The skilled person would also recognise that the embossing technique of the present invention can be used to pattern polymer based semiconductor layers to form many types of electrical devices such as transistors, diodes and other such components.

FIRST EXAMPLE

A grating structure suitable for use in a zenithal bistable display has been produced with zero offset in a photopolymer layer using the present invention.

The desired grating grooves were contained in the surface of a polycarbonate (PC) carrier film which had a total thickness of 125 µm. The grooves were previously formed in this film by hot-foil melting of the PC while in contact with a nickel shim.

The textured PC film was laminated against a piece of clean LCD glass which was 0.55 mm thick and carried a 100 nm thick surface coating of ITO (indium tin oxide). Before the lamination an excess (i.e. a nip) of a photopolymer material was added between the PC film and the glass.

The photopolymer is made up from a mixture of epoxy materials from Dow Chemical. The mixture comprised 58% Cyracure Resin UVR 6105, 38% Cyracure Resin UVR 6000 and 4% Cyracure photoinitiator UVI 6974.

The PC film and glass were laminated using apparatus of the type described with reference to FIG. 6a. The pair of rollers were rotated in order to move the laminate at a linear speed of 0.34 mm/s. Each of the pair of lamination rollers were identical with diameters of 69 mm and a Shore A hardness of 60. The roller separation was adjusted so that it was 1 mm less than the separation at which the rollers first touch each other; i.e. 1 mm of roller compression. This imparted the desired pressure during the lamination process.

After lamination, the photopolymer was cured by passing 365 nm radiation through the glass to a total dose of 2.9 J/cm$^2$. The PC layer was then peeled back from the glass to reveal a copy of the grating grooves adhered to the glass surface.

Referring to FIG. 15, a view of an SEM cross section of the sample is shown. The zero offset condition has been achieved since the troughs of the grooves can be seen to be in contact with the ITO layer. Inspection of the devices showed one or less interference fringes when illuminated by light from a sodium lamp. This was indicative of the zero offset condition.

The process was repeated with a larger roller compression of 2 mm instead of 1 mm. The zero offset condition was again achieved. In a separate experiment (at 1 mm roller compression), the lamination speed was increased from 0.34 mm/s to 0.79 mm/s. Again a zero offset was achieved. It can thus be seen that the zero offset condition can be obtained within a defined window of suitable process parameters and is thus well suited to high repeatability manufacturing.

To demonstrate embossing outside the regime of zero offset, another sample was embossed with a compression of 1 mm but at a linear speed of 10 mm/s. In this case the photopolymer material on the glass has a 0.58 µm offset as shown in FIG. 16.

The process described above with reference to FIG. 15 is also resistant to contamination by solid particles. This was demonstrated by performing a contamination study in which 3 µm spherical spacer beads (i.e. solid contaminants) were deliberately introduced during the embossing process.

FIG. 17 shows an SEM image of the grating structure produced by the embossing technique in the vicinity of the spacer beads, whilst FIG. 18 show the measured height profile of the surface along the line A-A in FIG. 17.

It can be seen from FIGS. 17 and 18 that the amount of non-uniformity produced by the contaminant is minimal. In other words, unwanted distortion to the offset of the grating profile only spreads a small distance from the spacer bead. In this case it was found that a increase in offset height of around 300 nm was produced over a circular area having a radius of around 2 mm.

Latching Voltage Calculations

For a Zenithal Bistable Device (ZBD) of the type described in patent EP0856164, the dependence of the latching field can be shown to be:

$$E_{LC} = \frac{V}{d_{LC} + \left(\frac{h_u}{\varepsilon_g} + \frac{h_g}{\varepsilon_g G + \varepsilon_{LC}(1-G)}\right)\varepsilon_{LC}} \quad (2)$$

This has been used to calculate the dependence of the field across the liquid crystal as a function of cell gap, grating offset and amplitude. FIGS. 19, 20 and 21 show data derived from equation (2) as various parameters are changed. The liquid crystal permittivity is assumed to be $\varepsilon_\| = 45$ and the grating permittivity $\varepsilon_g = 4.8$ is assumed throughout. It can be noted that decreasing the former and increasing the latter may prove advantageous.

Figure 19A:
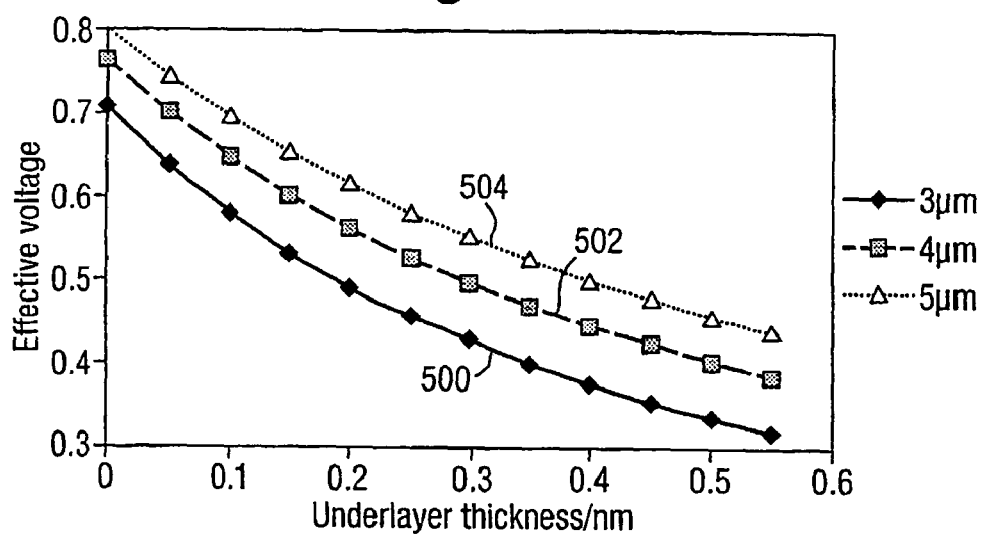
Figure 19B:
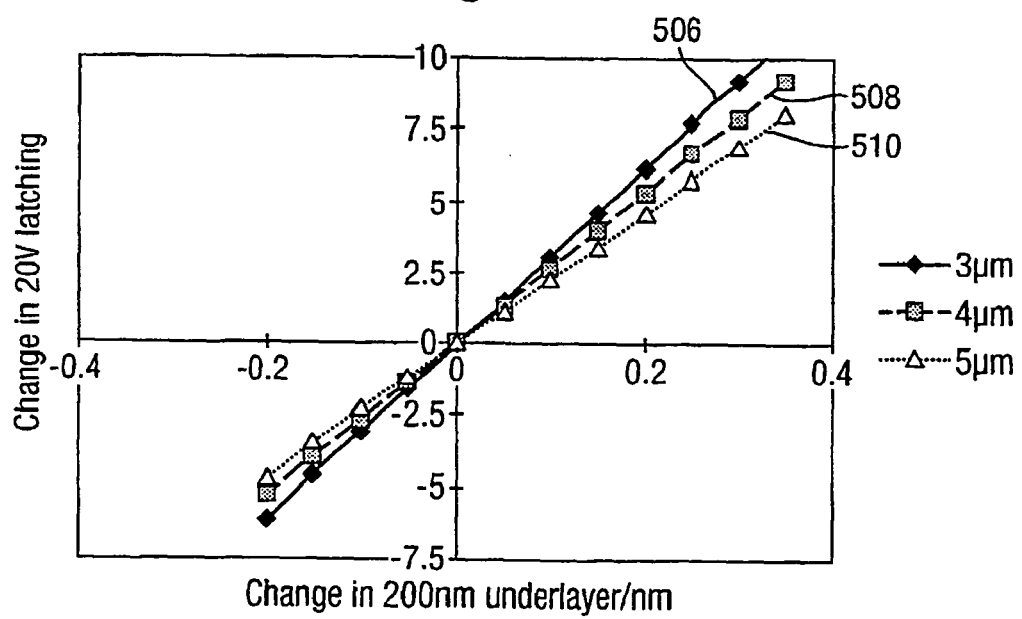

FIG. 19a shows the effective voltage applied to the liquid crystal material as a function of underlayer thickness (i.e. offset) for cell gaps of 3 μm (curve 500), 4 μm (curve 502) and 5 μm (curve 504). FIG. 19b shows the change from a 20V latching pulse as a function of the change in thickness of the underlayer (i.e. offset) for cell gaps of 3 μm (curve 506), 4 μm (curve 508) and 5 μm (curve 510). In this case a grating amplitude of 0.8 μm and a mark to space ratio (G) of 0.39 was assumed.

Figure 20A:
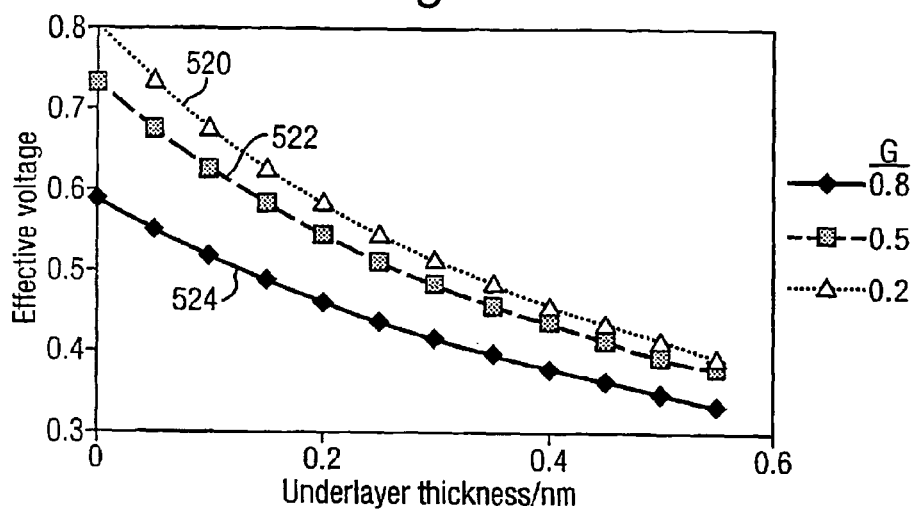
Figure 20B:
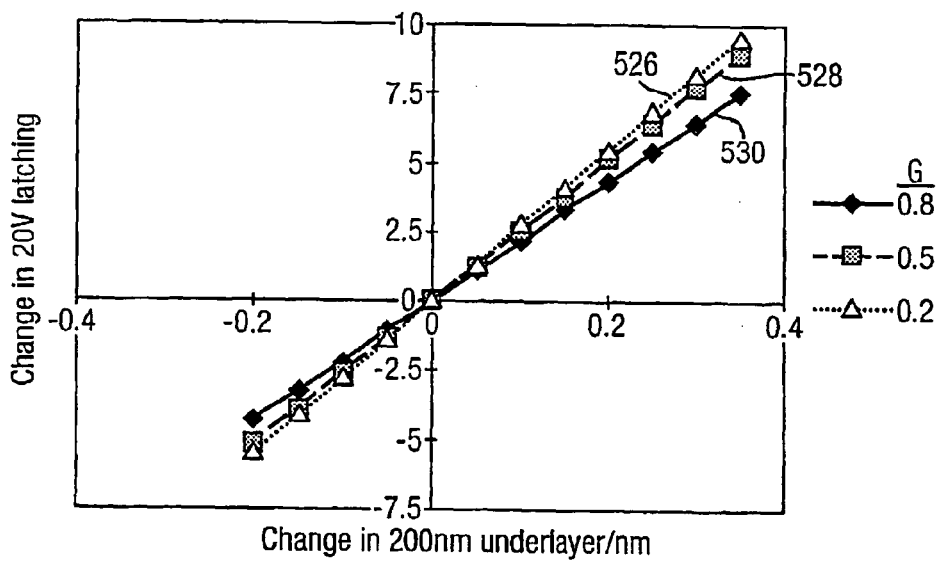

FIG. 20a shows the effective voltage applied to the liquid crystal material as a function of underlayer thickness (i.e. offset) for mark to space ratio (G) of 0.2 (curve 520), 0.5 (curve 522) and 0.8 (curve 524). FIG. 20b shows the change from a 20V latching pulse as a function of the change in thickness of the underlayer (i.e. offset) for mark to space ratio of 0.2 (curve 526), 0.5 (curve 528) and 0.8 (curve 530). In this case a grating amplitude of 0.8 μm and a cell gap of 4 μm was assumed.

FIG. 21a shows the effective voltage applied to the liquid crystal material as a function of underlayer thickness (i.e. offset) for grating amplitudes ($h_g$) of 0.4 μm (curve 540), 0.8 μm (curve 542) and 1.2 μm (curve 544). FIG. 21b shows the change from a 20V latching pulse as a function of the change in thickness of the underlayer (i.e. offset) for grating amplitudes ($h_g$) of 0.4 μm (curve 546), 0.8 μm (curve 548) and 1.2 μm (curve 550). In this case G=0.5 and a cell gap of 4 μm was assumed.

To summarise, high cell gaps, high mark to space ratios and high grating amplitudes are preferred to ensure latching uniformity as a function of offset. To prevent the latching voltages varying by 10% across a cell, a 200 nm offset needs to be controlled to about +50 nm. Obviously, for a 20V latching material, this corresponds to a 2V variation across the cell. The voltage waveforms used to address a panel would thus be designed to allow for this 2V variation in latching voltage arising from the offset variation. If analogue grey-scale is to be implemented using such structures, it is necessary for each error free level to be designed to allow for this variation. If a ±50 nm offset variation is achieved in practise, then we are likely to be restricted to four error-free analogue levels.

Improving materials (i.e. low voltage latching) will allow larger variations to occur, but probably will not increase the number of greys that is possible. Embossing into a conductor (such as poly-aniline or PEDOT) or into a homeotropically aligned liquid crystal monomer (high Δn) may be effective methods of reducing the sensitivity to offset variations.

Rather than produce a controlled offset with a suitable tolerance to variations, the alternative approach is to increase the pressure (i.e. W in equation 1) or reduce the throughput speed (i.e. V in equation 1) to ensure that the offset is close to zero (T=A). In this fashion, offset variations are minimised and the electric field applied across the device is maximised. For applications where the shape of the surface relief structure is important, such as the zenithal bistable liquid crystal device, care must be taken to ensure that the Youngs modulus of the carrier film, and in particular the inverse surface relief structure on said carrier film, is sufficiently high to prevent significant deformation of the structure during the embossing process. This is shown in the following example.

SECOND EXAMPLE

SEMs of a typical ZBD grating master are shown in FIG. 22. The master comprises three regions of different pitch, which form areas within each pixel of different electro-optic characteristics, thereby leading to the advantageous property of greyscale. The groove shape may be characterised in terms of the amplitude A, mark-to-space ratio, shallow α and steep β side wall angles and the offset O. For the 1.2 μm master shown in FIG. 22, the values are given in table 1:

TABLE 1

| Pitch (μm) | 1.0 | 0.8 | 0.6 |
|---|---|---|---|
| Amplitude (μm) | 1.21 | 1.20 | 0.87 |
| Offset (μm) | 0.0 | 0.0 | 0.32 |
| Mark-to-space (%) | 53% | 53% | 57% |
| Shallow side α (°) | 82 | 85 | 83.5 |
| Steep side β (°) | 91 | 93 | 85 |

Note, that A+O=1.2 μm for all pitches. Masters with a range of different thicknesses were fabricated, from 0.9 μm to 1.2 μm. Each master was used to form a Nickel shim by a combination of sputtering and electro-deposition, followed by the production of carrier film formed from a lacquer on a PET film, using the method described previously. This carrier film was used to emboss grating alignment structures onto ITO coated glass substrate. To help ensure that the embossed grating had the same symmetry as the original master, an even number of generations of the Nickel shim was used. Eg. Master=positive: Shim generation 1=negative: Shim generation 2=positive: carrier film=negative: embossed grating=positive. If appropriate, the opposite shape symmetry can be obtained in the embossed grating to give slightly different properties.

FIG. 23 shows the resulting structures when the Young's modulus of the lacquer, E is low relative to the pressure applied to the 40 cm rollers. The Lacquer had a Young's modulus of about 120 MPa, whereas a 30 kPa pressure was applied. Equation (1) predicts that the grating amplitude equals 1.2 μm for a throughput speed of about $2.2 \times 10^{-3}$ M/s (using the parameters: μ=0.6 Pas; E=$1.2 \times 10^8$ Pa; R=0.1 m; W=12 kN/m). That is, the offset in the resulting embossed structure is approximately zero for throughput speeds of about 14 cm/min and below. Equation (1) predicts that a speed of 10 cm/min (V=$1.66 \times 10^{-3}$ m/s) should give a grating amplitude of 0.5 µm, significantly lower than the amplitude of the master. That is, the throughput speed is sufficiently slow to ensure contact between the carrier film lacquer and the substrate, thereby ensuring zero offset (O=0.0 µm) for each of the grating areas.

At or below the throughout speeds required for the zero offset condition, the deformation of the film is largely determined by the force applied by the glass. This is applied in the direction perpendicular to the glass surface, hence the film deforms according to its Young's modulus. In this example, the strain on the lacquer material, given by P/G.E, was approximately 6% (given the mark to space ratio of G=0.4). However, it is clear that the lacquer was unable to support the applied force, causing the grating to be distort in the 1.0 µm and 0.8 µm pitch regions.

The degree of distortion observed in the structures of FIG. 23 may be suitable for some applications. However, for surface alignment of liquid crystal devices, and in particular achievement of zenithal bistability, uniformity is essential. Hence, in such cases it is important to reproduce the desired shape faithfully without significant distortion. The structures of FIG. 23 show that it is difficult to produce the 1.2 µm amplitude gratings of FIG. 22 at such high pressures. Solutions to this include:—

(a) Choice of a lower amplitude structure. For a bistable liquid crystal device, the amplitude of the grating is a key factor for determining the relative energies of the different states. Hence, a particular liquid crystal may require a particular amplitude. If the structure is used as a spacer for the glass plates, then the required amplitude may be quite high, for example, being set by the optimum cell gap for the optical properties of the device. Most liquid crystal devices, require a cell gap of between 2 µm and 6 µm spacing.

(b) Increase the mark to space ratio; For a bistable liquid crystal device such a the zenithal bistable device, the shape plays an important role in the relative energies of the stable states. Moreover, the shape effects the optical properties of the aligned liquid crystal material. In the so-called defect state, for instance, the pre-tilt of the liquid crystal is dependent on the mark to space ratio: a particular shape will therefore be required to ensure good optical characteristics.

(c) Increase the Young's modulus of the carrier structure. The carrier structure and fixable material are carefully matched to give good release properties. For example, the photopolymer is chosen to give a slight shrink-age during UV curing, to help it de-laminate from the carrier. The photopolymer used in the present study shrunk by about 15% on curing. Hence, the dimensions of the final embossed gratings differ from the master by this extent and this needs to be accounted for in the original master design. Release is also helped by ensuring that the carrier material has a relatively low surface energy. The inventors have investigated a number of carrier layers, and successful release obtained for lacquers with Young's modulus of 500 Mpa.

(d) Increase the roller radius.

(e) Increase the throughput speed of the substrate and carrier film relative to the roller.

(f) Decrease the viscosity of the photopolymer. The inventors have found good release and fidelity of the grating shape produced by embossing for photopolymers with viscosities from 10 cP to 1000 cP.

(g) Reduce the applied pressure. This requires a lower throughput to be used to achieve the zero offset condition.

THIRD EXAMPLE

Options e), f) and g) are each inter-related through equation (1). Operating close to the condition for zero offset is difficult for complex structures such as those shown in FIG. 22, since the 1.0 µm regions requires a different speed for zero offset to the 0.6 µm regions. Conditions of pressure, viscosity and pressure are required that give the desired offset for each of the regions without too great a change in the fidelity of the original shape for each of the regions. In this example, it required a pressure, speed and viscosity to be chosen that gives zero offset for the 0.6 m pitch region, whilst ensuring the pressure was sufficiently low to prevent catastrophic damage to either the 0.8 µm or 1.0 µm regions.

FIG. 24 shows the SEM cross sections for each area of different pitch when produced using an embossing pressure of 0.45 bar (approximately 100 Pa) and throughput speeds ranging from 1 cm/min to 10 cm/min.

Figure 24A:
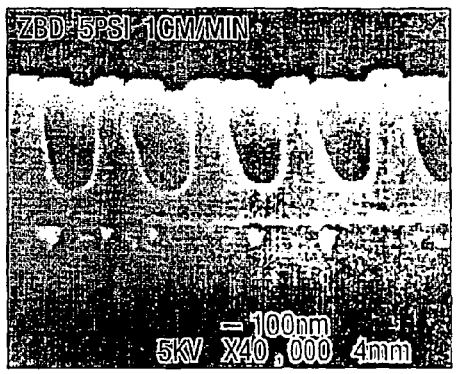
Figure 24D:
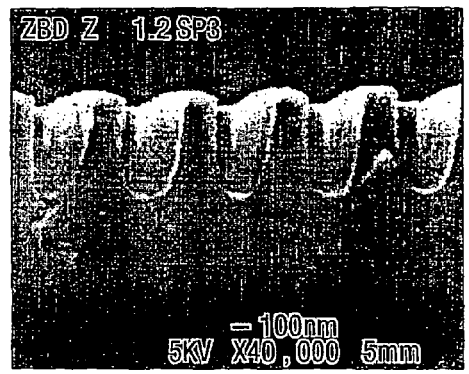
Figure 24B:
Figure 24E:
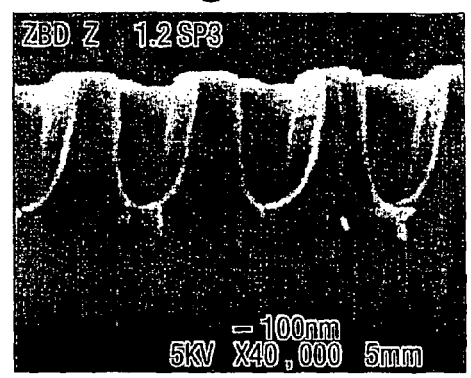
Figure 24C:
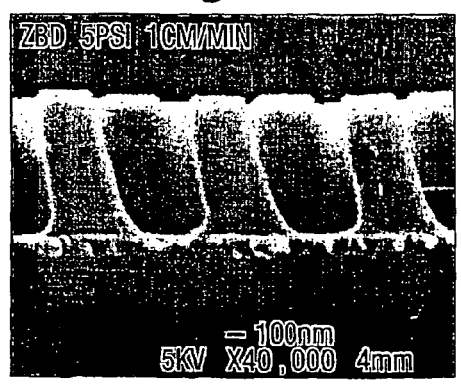
Figure 24F:
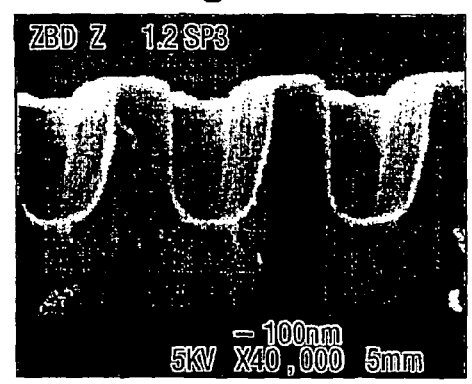
Figure 24G:
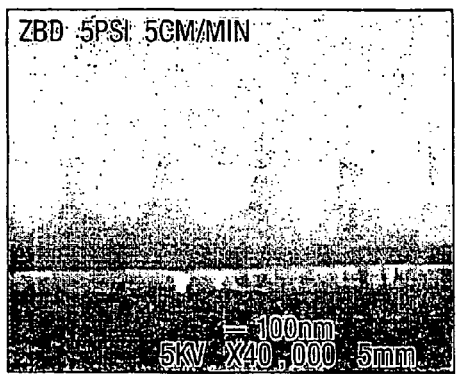
Figure 24J:
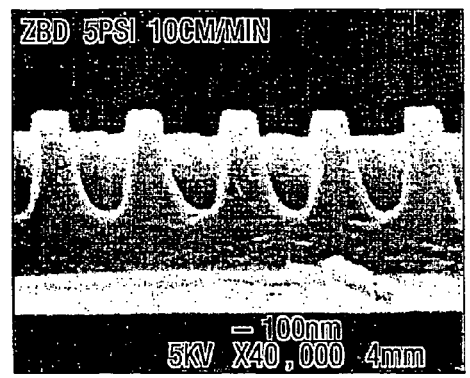
Figure 24H:
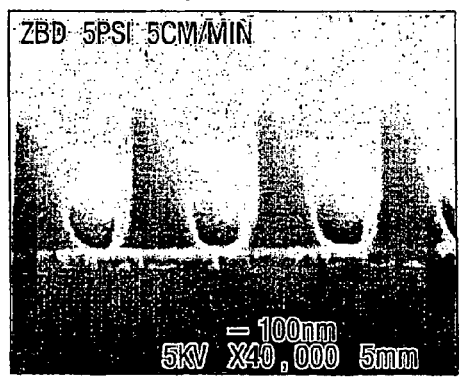
Figure 24K:
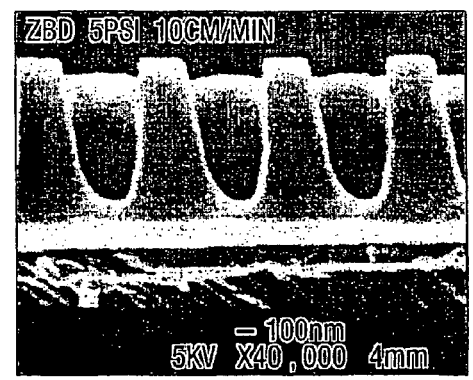
Figure 24I:
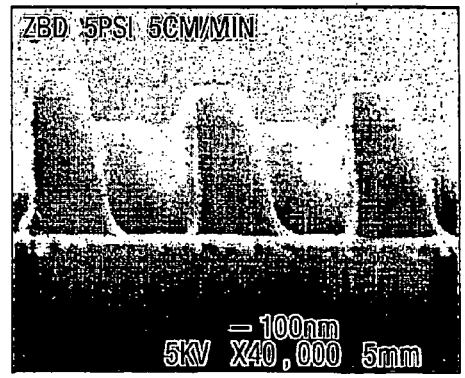
Figure 24L:
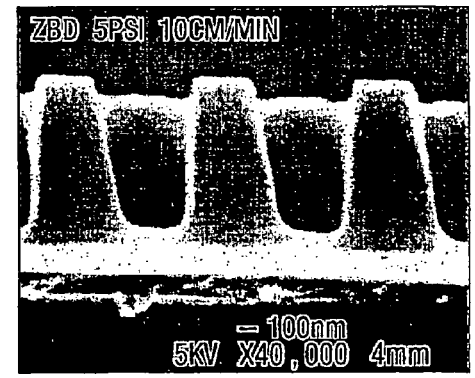
Figure 25A:
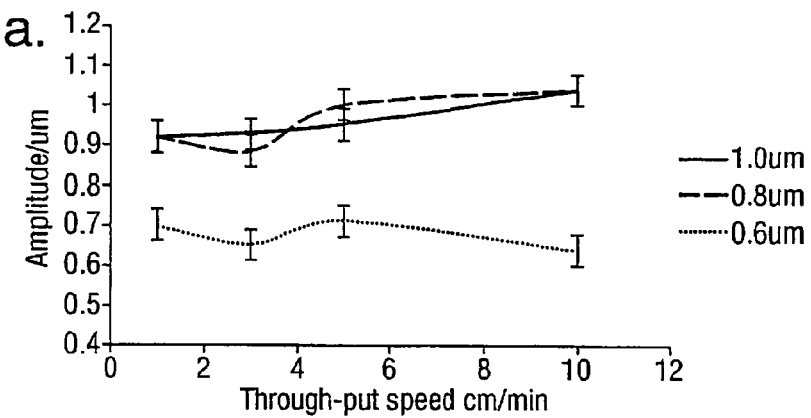
Figure 25B:
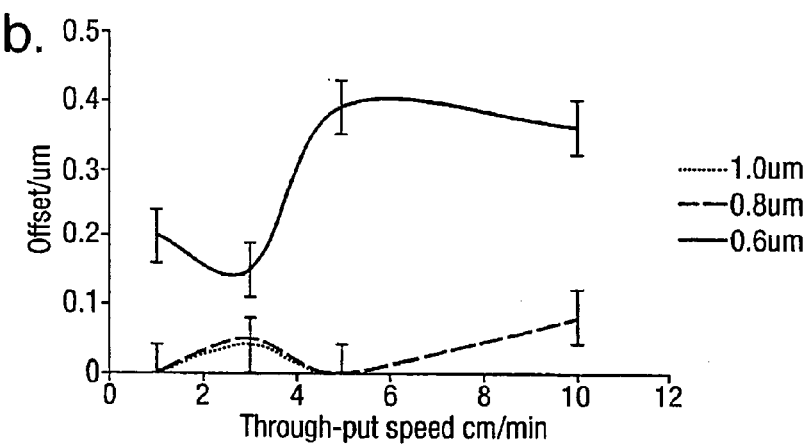
Figure 25C:
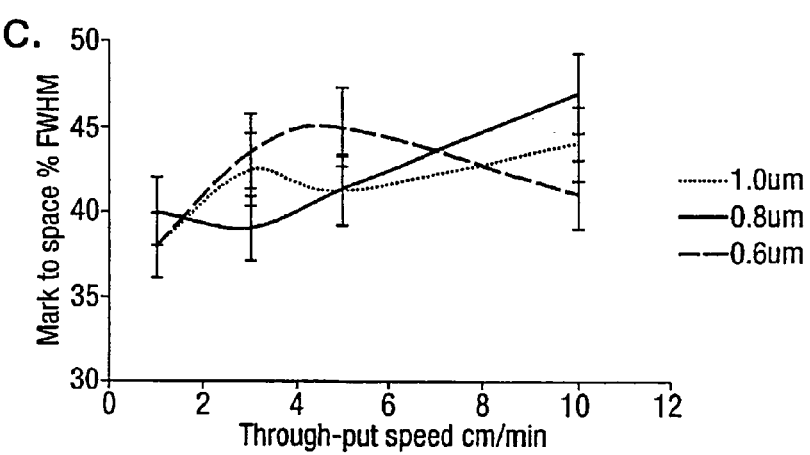
Figure 25D:
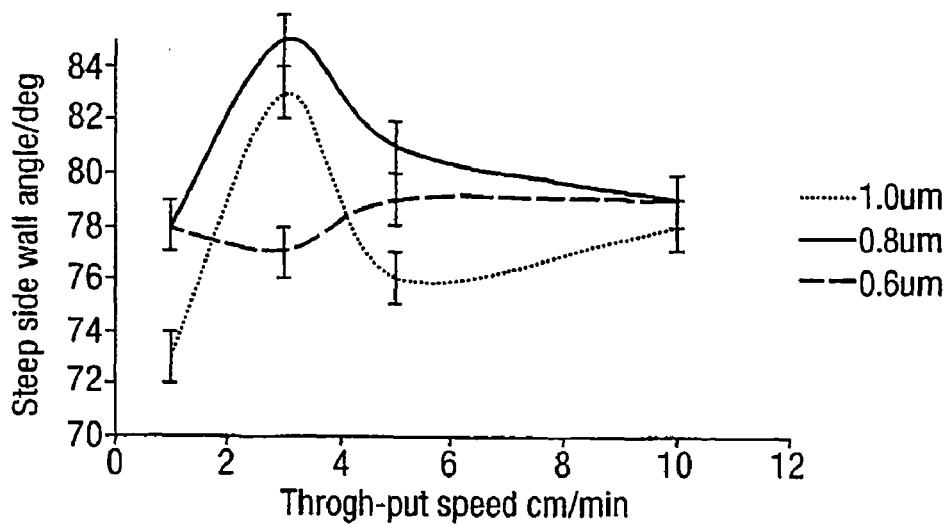
Figure 25E:
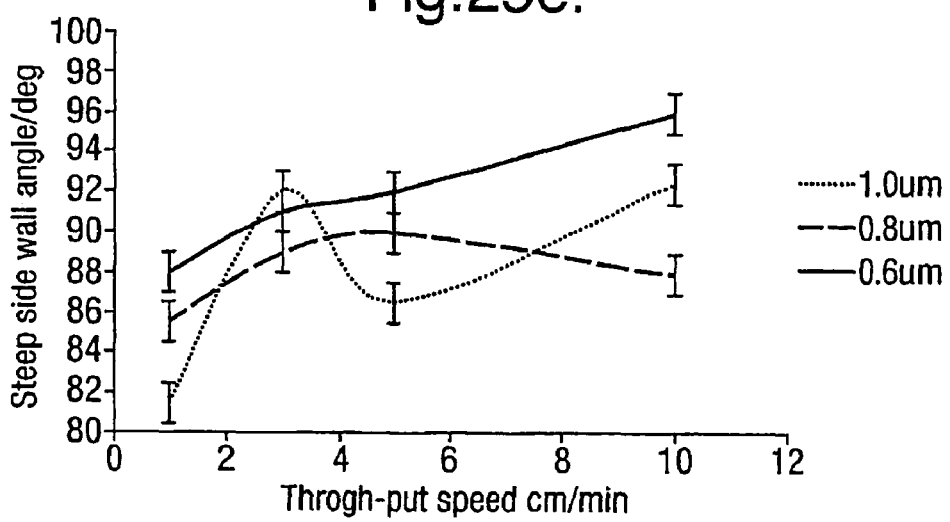

The grating produced for a speed of 1 cm/min with pitches of 0.6 µm, 0.8 µm and 1.0 µm are shown in FIG. 24a, FIG. 24b and FIG. 24c respectively. The grating produced for a speed of c cm/min with pitches of 0.6 µm, 0.81 µm and 1.0 µm are shown in FIG. 24d, FIG. 24e and FIG. 24f respectively. The grating produced for a speed of 5 cm/min with pitches of 0.6 µm, 0.8 µm and 1.0 µm are shown in FIG. 24g, FIG. 24h and FIG. 24i respectively. The grating produced for a speed of 10 cm/min with pitches of 0.6 µm, 0.8 µm and 1.0 µm are shown in FIG. 24j, FIG. 24k and FIG. 24l respectively.

The shapes are analysed in detail in FIG. 25. These results show that there is no speed where the 0.6 µm pitch region gives a zero offset but that good fidelity of the all of the structures is possible across the range of speeds. An increase of the pressure to about 300 Pa is required to achieve zero offset, but the pressure is still sufficiently low to prevent significant damage to the grating shapes obtained.

FOURTH EXAMPLE

Similar masters to those of FIG. 22, but with amplitudes of 1.0 µm and 1.1 µm were also used to emboss gratings at the low pressure of 0.45 bar (approximately 100 Pa). Speeds of 3 cm/min and 5 cm/min were chosen.

Figure 26A:
Figure 26D:
Figure 26B:
Figure 26E:
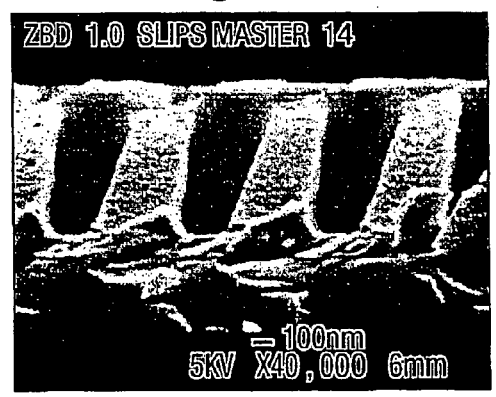
Figure 26C:
Figure 26F:
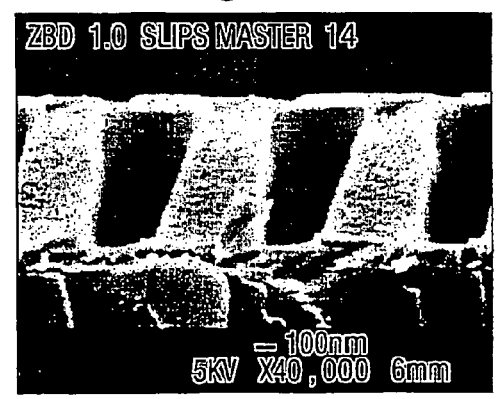

The master gratings are shown in FIG. 26 as follows: 0.9 µm amplitude and 0.6 µm pitch (FIG. 26a); 0.9 µM amplitude and 0.8 µm pitch (FIG. 26b); 0.9 µm amplitude and 1.0 µm pitch (FIG. 26c): 1.0 µm amplitude and 0.6 µm pitch (FIG. 26d); 1.0 µm amplitude and 0.8 µm pitch (FIG. 26c): 1.0 µm amplitude and 1.0 µm pitch (FIG. 26f);

The resulting embossed gratings produced using the master shown in FIG. 26 are shown in FIG. 27.

Figure 27A:
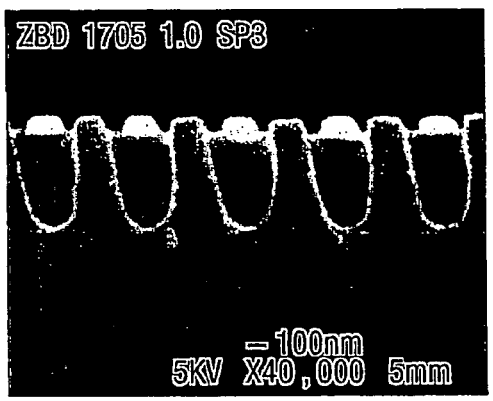
Figure 27D:
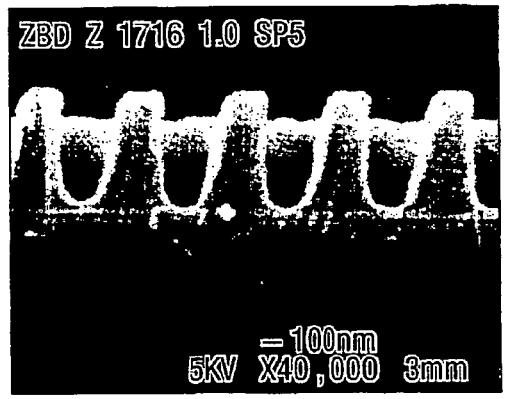
Figure 27B:
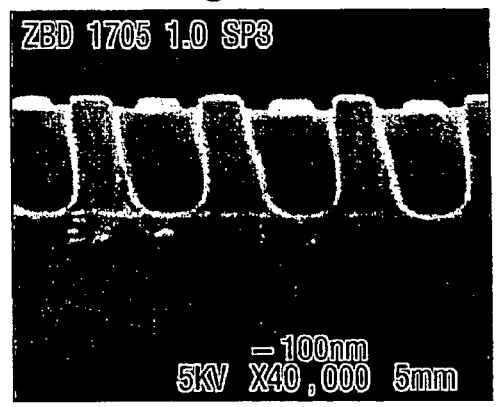
Figure 27E:
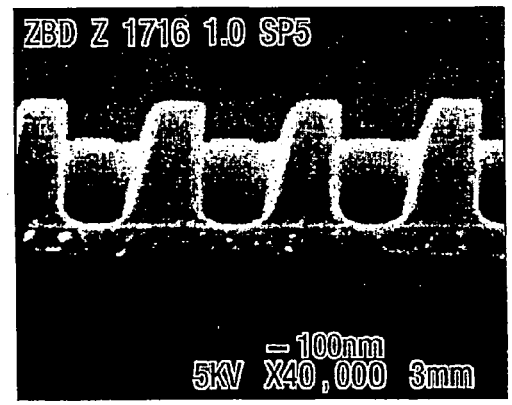
Figure 27C:
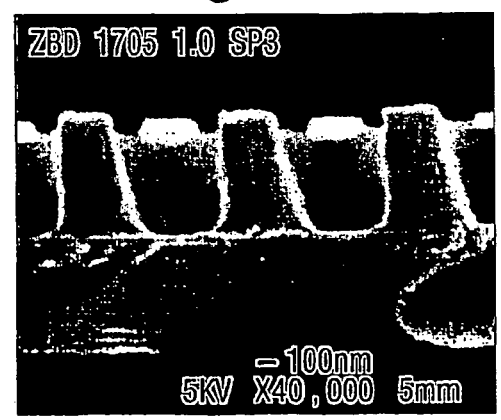
Figure 27F:
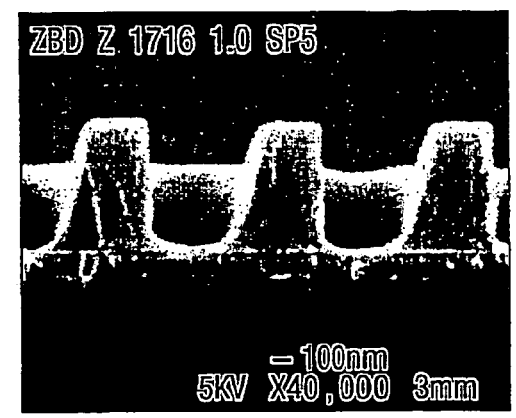

The grating produced from the 1.0 µm master for a speed of 3 cm/min with pitches of 0.6 µm, 0.8 µm and 1.0 µm are shown in FIG. 27a, FIG. 27b and FIG. 27c respectively. The grating produced for a speed of 5 cm/min with pitches of 0.6 µm, 0.8 µm and 1.0 µm are shown in FIG. 27d, FIG. 27e and FIG. 27f respectively.

Figure 27G:
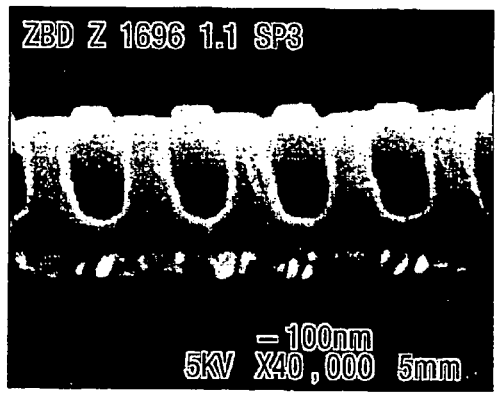
Figure 27J:
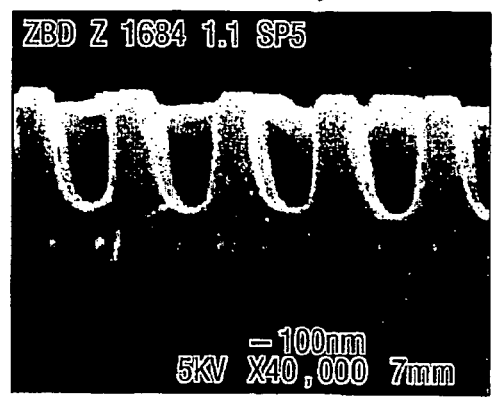
Figure 27H:
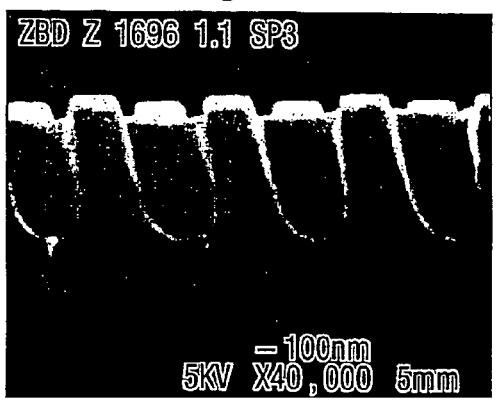
Figure 27K:
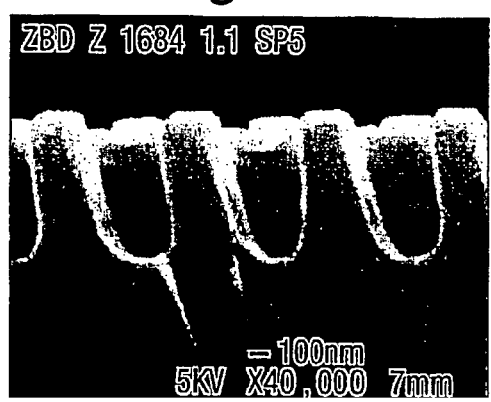
Figure 27I:
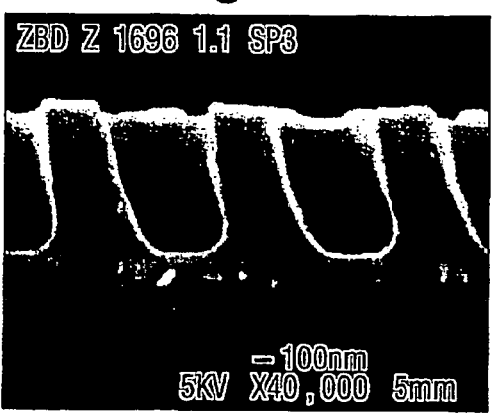
Figure 27L:
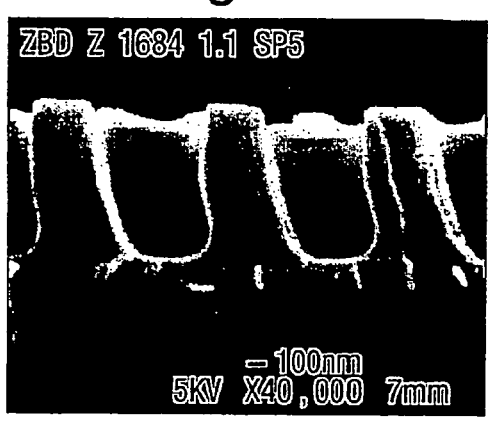
Figure 28C:
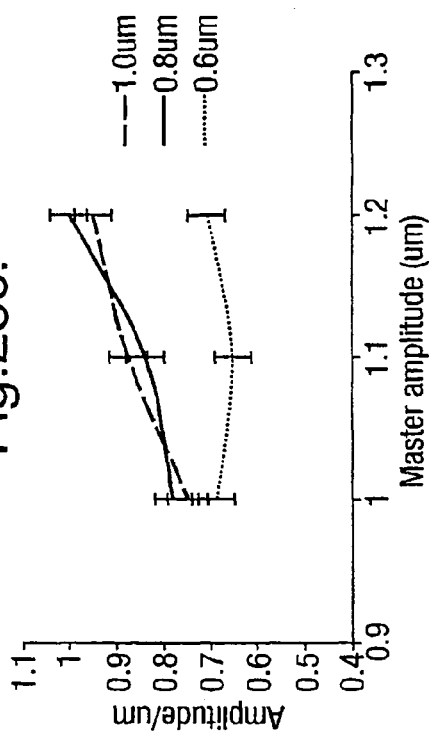
Figure 28D:
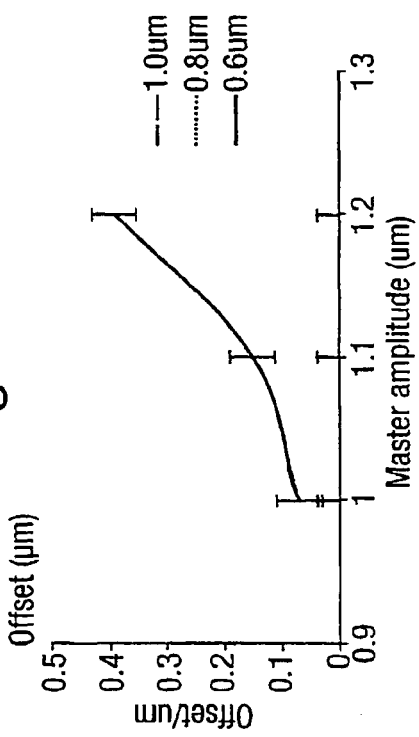
Figure 28A:
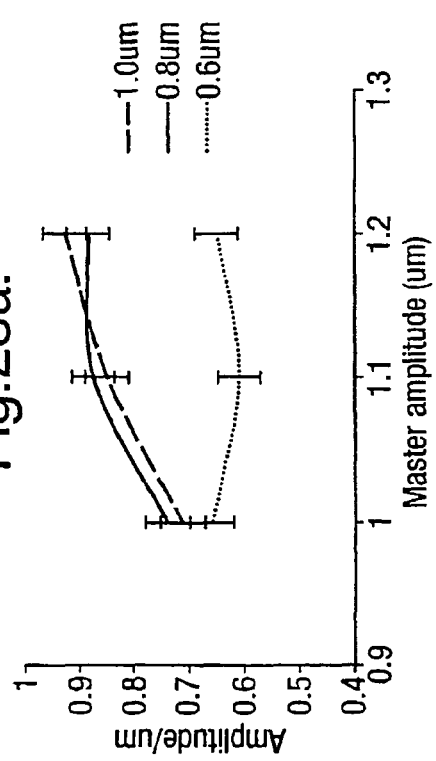
Figure 28B:
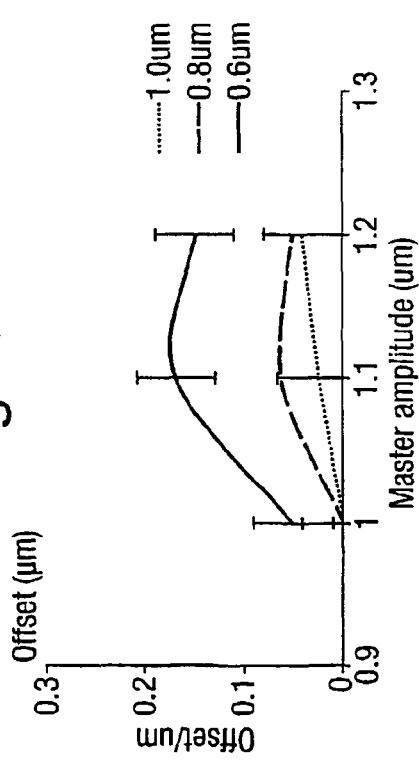
Figure 29A:
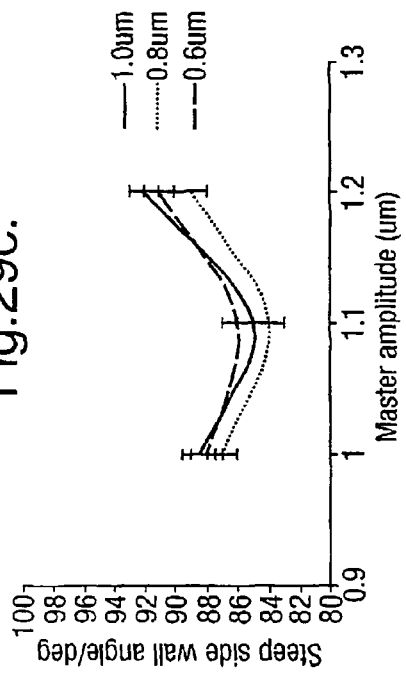
Figure 29B:
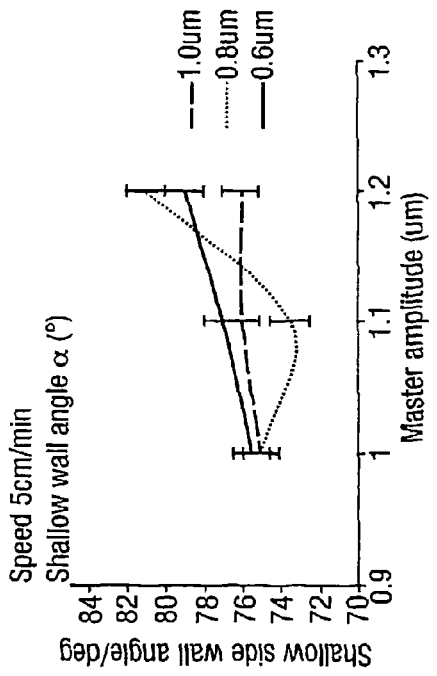
Figure 29C:
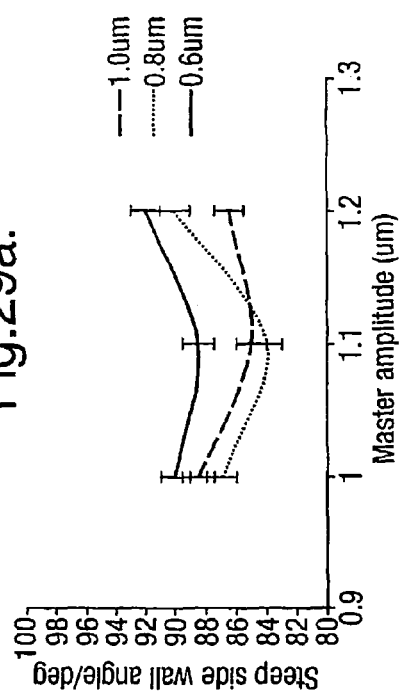
Figure 29D:
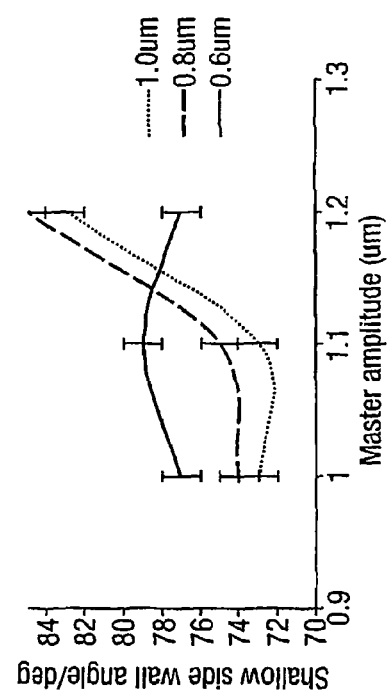

The grating produced from the 1.1 µm master for a speed of 3 cm/min with pitches of 0.6 µm, 0.8 µm and 1.0 µm are shown in FIG. 27g, FIG. 27h and FIG. 27i respectively. The grating produced for a speed of 5 cm/min with pitches of 0.6 µm, 0.8 µm and 1.0 µm are shown in FIG. 27j, FIG. 27k and FIG. 27l respectively.

Figure 30A:
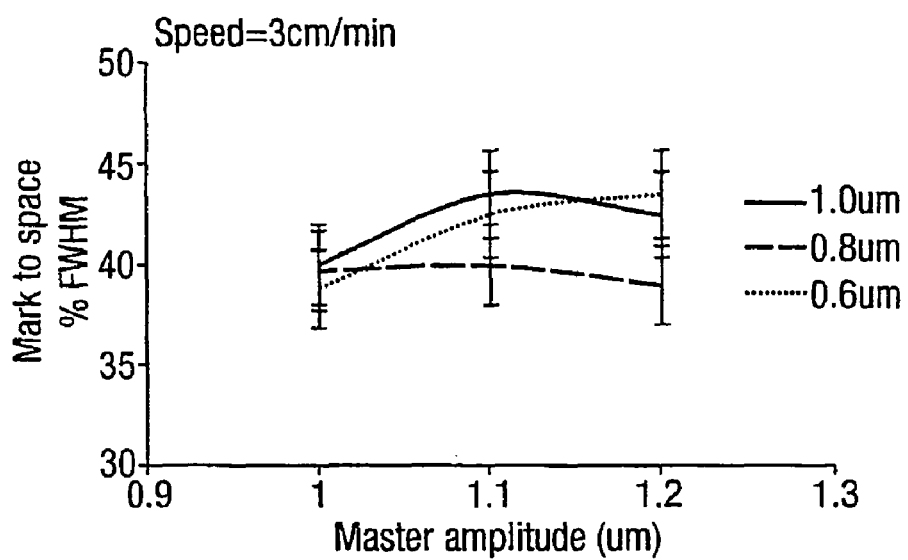
Figure 30B:
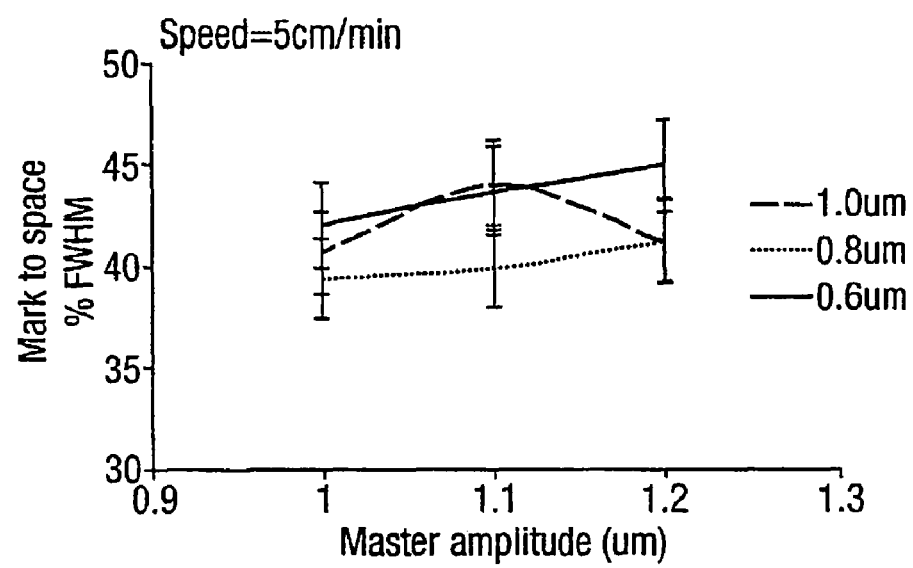

The shapes of the embossed gratings of FIG. 27, together with the appropriate 1.2 µm results from the previous example, are given in FIGS. 28 to 30. FIGS. 28a, 28b, 29a, 29b and 30a show various properties when using a speed of 3 cm/min, whilst FIGS. 28c, 28d, 29c, 29d and 30b show these properties when using a speed of 5 cm/min.

These results clearly show good fidelity with an offset of less than (0.1±0.02)μm is possible using the 1.0 μm master both at speeds of 3 cm/min and 5 cm/min. This range is representative of any variations in uniformity (from those associated with the master, the substrate and the embossing conditions) that is anticipated in a production environment. Hence, the inventors have defined a regime that satisfies both the complex shape requirements of the surface relief structure, and the requirements for a low cost fabrication method with an appropriate manufacturing yield.

No deformation of any region, including both the 1.0 and 0.8 μm regions occurs at this pressure (and for the Young's modulus of the carrier film lacquer used), and the shape of all three regions is equivalent to within experimental errors, except for the differences in pitch. Thus, the required shape has been replicated accurately.

FIFTH EXAMPLE

The pressure applied to the rollers was increased to 3 bar (applying a force of W=1500 N/m) using the same 1.2 μm masters and SEM results for the resulting gratings are shown in FIG. 31 for embossing throughput speeds of 30 cm/min (FIG. 31a) and 10 cm/min (FIG. 31b). Clearly, speed 30 cm/min was suitable for giving good fidelity of surface relief profile, but the slower speed was too far below the dry contact limit. The resulting grating shape was severely damaged, due to the excessive strain applied to the grating, and the resulting liquid crystal alignment was found to be poor.

Optical characterisation of the grating was done by measuring the interference fringes from a sodium lamp, measuring the zero-order diffraction spectrum from the grating (or ZOD colour) and studying the grating texture under a high magnification. The results for differing speeds is shown in the table below. Speed 15 cm/min was observed to be in the optimum range (between the upper limit for minimum offset and the lower speed limit for damaging the grating structure).

TABLE 2

Characterisation of Offset for 3 bar Pressure.

| Roller Speed (cm/min) | Observations |
| --- | --- |
| 30 | Mottled first/second fringe |
| 20 | Mainly zero offset but with onset of mottling |
| 15 | Perfect zero offset |
| 10 | Zero offset with subtle signs of crushing in transmission |
| 5 | Fern texture of grating; obviously crushed in centre |

Referring to FIG. 32, it is illustrated how the thickness profile may vary across the sample with an offset that is close to zero. A substrate 320 is provided that carries and electrode 322. The inverse profile of the carrier film 324 embosses the fixable layer 326 with the required surface profile 328. The offset O is also shown. It can be seen that the present invention enables areas to have a controllable thickness that is substantially higher than the offset.

Referring to FIG. 33, the layer thickness as a function of applied load is shown for a number of fixable materials of different Youngs modulus. FIG. 34 shows the viscosity multiplied by throughput speed that is required to achieve zero offset as a function of applied load for a number of fixable material of different Youngs modulus. The data shown in FIGS. 33 and 34 is derived from equation 1 above. A theoretical estimate for the upper limit of throughput speed for achieving the minimum offset condition is also shown in FIG. 35. It has thus been shown how the speed and viscosity required to attain the required offset condition can be calculated.

SIXTH EXAMPLE

FIG. 36 shows SEM images of an embossed grating from a second lacquer at an embossing pressure of 0.45 Bar and a speed of 2 cm/min to provide an offset that is zero and uniform. FIG. 37 provides SEM images of an embossed grating from a second lacquer at an embossing pressure of 5.5 Bar and a speed of 2 cm/min; this provides an offset that is zero and uniform and a grating shape that is identical to the lower embossing pressure case of FIG. 36. The Young's modulus of this second lacquer was measured as 80 MPa. The use of this increased Young's modulus proved advantageous since it gave a wider range of pressures and/or viscosity-speed product that could be used to faithfully reproduce the desired grating shape and achieve the required offset condition. This is because the ratio of the hydrodynamic pressure to the elastic restoring forces was reduced, thereby allowing fast throughput speeds to be achieved, and the increased rigidity of the structure enabled higher loading pressures to be used without distortion or damage to the required surface profile.

It has been found that there is an upper limit to the Young's modulus that is desirable for the carrier film surface. Contaminants on the surface distort the film to an extent that is related to the relative Young's moduli of film and contaminant. This leads to an increase in offset that extends for a radius well beyond that of the contaminant. In a liquid crystal device, this can lead to area that remain unswitched and is highly undesirable. Usually, the fabrication is done in a clean environment (either using a clean-room or a dedicated chamber for the embossing machine), but it is still advantageous that the process is designed to be insensitive to contaminants that might still occur. For example, contaminants of 5 μm or below should not cause offset change that extends across a significant proportion of a pixel. For example, the radius of disruption must be limited to 100 μm, and preferably 50 μm and below. Typically, this requires that the Young's modulus of the carrier film should be less than 3 GPa, and preferably less than 1 GPa.

FIG. 38 shows the transmission spectra of the two embossed gratings shown in FIGS. 36 and 37. It can be noted that there is little difference between the two spectra indicating a similar grating amplitude, pitch and offset.

The 0.45 and 5.5 bar gratings of shown on FIGS. 36 and 37 show that the minimum offset condition was met with no distortion of the grating shape at speed 2 cm/min. This shows the advantage of using a higher Young's modulus lacquer. The upper limit of lacquer E is set by the requirement for uniformity with contamination. The inventors found that E=85 kN was still sufficiently low to prevent 4 μm contaminants from leading to significant visible disruption of the minimum offset condition.

FIG. 39 illustrates embossing apparatus that uses a feedback loop to control the embossing process of the present invention. The embossing apparatus 600 comprises a pair of lamination rollers 602 and a pair of delamination rollers 604. The lamination rollers carry an elastomeric layer on their outer surface, and control of the force applied thereby is controlled using a pneumatic system 606.

In use, the carrier film 608 is stripped of a protective layer of film 609 by a third pair of rollers 610. The carrier film is then laminated with a substrate 612 at the lamination rollers 602; in this example lamination is performed in the constant pressure regime, indicated by the distortion of the embossing rollers. The correct amount of uncured photopolymer 614 is printed onto the substrate 612 before lamination. This enables the photopolymer material to be deposited only in the regions where it is required. Selective printing is preferred, although by no means essential, as it removes the need for selective removal of the photopolymer after curing and delamination. The selective printing allows, for example, areas of the grating around the edge of the display to remain photopolymer free to enable electrical contact to be made thereto. The printed photopolymer material is deposited to a depth of approximately (G−1)A, where A is the grating amplitude and G is the mark to space ratio. This ensures that lateral spreading of the photopolymer is minimised.

Once laminated, UV is applied through the carrier layer. In such an arrangement, the carrier layer should be stable and transparent to the UV illumination from above, rather than from below, allows gratings to be produced on reflective substrates.

Optical transmission means 616 are provided to measure the optical transmission characteristics after delamination. The output of the optical transmission means 616 is fed back to the microprocessor unit 618 that alters the load applied by the pneumatic system 606 and/or the throughput speed of the apparatus.

A first anti-static air jet 620 may be applied after removal of the protective layer of film from the carrier layer to ensure dust free embossing. A second anti-static air jet 622 may also be provided to clean the carrier film after deamination if the carrier film is to be used more than once.

An inspection system 624 may also be incorporated on the lamination side to allow quality control of the carrier film immediately before lamination (after removal of the protective film and after cleaning). This may include a digital camera and the microprocessor 618 could then include software for image analysis.

The invention claimed is:

1. A method of embossing a layer of fixable material with a surface profile comprising the steps of;
   a) taking a flexible carrier film having an inverse of the required surface profile formed on one side thereof,
   b) taking a layer of fixable material located on a substrate that comprises an electrode,
   c) laminating the carrier film and substrate such the carrier film causes the required surface profile to be formed in the layer of fixable material, and
   d) fixing the fixable material,
   wherein the method is performed such that the offset of the surface profile divided by the relative permittivity of the fixable material is less than 1000 nm.

2. A method according to claim 1 and further comprising the step, after the step of fixing the fixable material is performed, of removing the carrier film from the layer of fixable material.

3. A method according to claim 1 wherein the fixable material weakly adheres to the side of the carrier film carrying the inverse of the required surface profile to facilitate removal of the carrier film from the fixed layer of fixable material.

4. A method according to claim 1 wherein at least one additional layer is interposed between the layer of fixable material and the carrier film prior to lamination.

5. A method according to claim 1 wherein the substrate is formed from a brittle material.

6. A method according to claim 1 wherein the fixable material is a resin that is curable using ultra-violet radiation.

7. A method according to claim 1 wherein the viscosity of the fixable material is less than 2000 cps.

8. A method according to claim 7 wherein the viscosity of the fixable material is less than 500 cps.

9. A method according to claim 1 wherein the viscosity of the fixable material is greater than 0.1 cps.

10. A method according to claim 9 wherein the viscosity of the fixable material is greater than 5 cps.

11. A method according to claim 10 wherein the viscosity of the fixable material is greater than 50 cps.

12. A method according to claim 1 wherein the pressure applied during lamination is between 0.002 N/mm$^2$ and 100 N/mm$^2$.

13. A method according to claim 1 wherein the offset of the surface profile divided by the relative permittivity of the fixable material is less than 100 nm.

14. A method according to claim 13 wherein the offset of the surface profile divided by the relative permittivity of the fixable material is less than 50 nm.

15. A method according to claim 14 wherein the offset of the surface profile divided by the relative permittivity of the fixable material is less than 10 nm.

16. A method according to claim 1 wherein, during the lamination step, the carrier film is brought into contact with the substrate carrying the layer of fixable material and passed through a means of applying the pressure required for lamination.

17. A method according to claim 16 wherein a sensing means is provided to monitor the surface profile formed in the layer of fixable material after it has passed through the means of applying the pressure required for lamination.

18. A method according to claim 17 wherein the pressure applied during lamination is adjusted in response to the output of the sensing means to ensure the required surface profile is formed in the layer of fixable material.

19. A method according to claim 16 wherein the means of applying the pressure required for lamination comprises at least one lamination roller.

20. A method according to any of claim 19 wherein the means of applying the pressure required for lamination comprises a first lamination roller in contact with the carrier film and a second lamination roller in contact with the side of the substrate not carrying the layer of fixable material, the first and second lamination rollers being biased toward one another.

21. A method according to claim 19 wherein at least one lamination roller is deformable.

22. A method according to claim 19 wherein at least one lamination roller comprises rubber.

23. A method according to claim 19 wherein at least one lamination roller has a Shore hardness in the range of 50 to 90.

24. A method according to claim 19 wherein the radius of the lamination roller is greater than 1 cm.

25. A method according to claim 19 wherein the radius of the lamination roller is less than 1 m.

26. A method according to claim 19 wherein the carrier film is removed from the fixed fixable layer using at least one separation roller and the fixing step is performed by applying the appropriate treatment in a region between the at least lamination roller and the at least one separation roller.

27. A method according to claim 16 wherein the substrate carrying the layer of fixable material is passed through the means of applying the pressure required for lamination at a linear speed greater than 0.1 mm per second.

28. A method according to claim 16 wherein the substrate carrying the layer of fixable material is passed through the means of applying the pressure required for lamination at a linear speed less than 100 cm per second.

29. A method according to claim 1 wherein the lamination step is performed by biasing the carrier film toward the substrate using gas pressure.

30. A method according to claim 1 and comprising the additional step of forming the carrier film using a patterned roller.

31. A method according to claim 1 wherein the carrier film comprises any one of PET, PC, and PMMA.

32. A method according to claim 1 wherein the surface profile formed in the fixable material is suitable to provide bistable alignment of liquid crystal material in a liquid crystal device.

33. A method according to claim 1 wherein the surface profile formed in the fixable material is suitable to provide zenithal bistable alignment of liquid crystal material in a liquid crystal device.

34. A method according to claim 1 wherein the amplitude of the embossed surface profile is less than 50 µm.

35. A method according to claim 1 wherein the amplitude of the embossed surface profile is greater than 0.1 µm.

36. A method according to claim 1 wherein the width of the features of the embossed surface profile is less than 100 µm.

37. A method according to claim 1 wherein the width of the features of the embossed surface profile is greater than 0.1 µm.

38. An electronic device comprising an embossed structure fabricated using the method as claimed in claim 1.

39. An electro-optic device comprising an embossed structure fabricated using the method as claimed in claim 1.

40. An organic semiconductor device comprising an embossed structure fabricated using the method as claimed in claim 1.

41. An organic light emitting diode comprising an embossed structure fabricated using the method as claimed in claim 1.

* * * * *